US007493397B1

(12) United States Patent
Guthrie et al.

(10) Patent No.: US 7,493,397 B1
(45) Date of Patent: Feb. 17, 2009

(54) PROVIDING REMOTE PROCESSING SERVICES OVER A DISTRIBUTED COMMUNICATIONS NETWORK

(75) Inventors: Scott D. Guthrie, Bellevue, WA (US);
Erik B Christensen, Seattle, WA (US);
Yann E. Christensen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 948 days.

(21) Appl. No.: 09/875,324

(22) Filed: Jun. 6, 2001

(51) Int. Cl.
*G06F 15/16* (2006.01)

(52) U.S. Cl. .................. 709/227; 709/202; 709/219; 719/315

(58) Field of Classification Search .......... 709/201–203, 709/217–219, 227–229; 715/513; 719/313–317, 719/330
See application file for complete search history.

(56) References Cited

U.S. PATENT DOCUMENTS

| 3,937,925 | A | 2/1976 | Boothroyd |
| 3,956,615 | A | 5/1976 | Anderson et al. |
| 4,186,871 | A | 2/1980 | Anderson et al. |
| 4,807,154 | A | 2/1989 | Scully et al. |
| 4,847,785 | A | 7/1989 | Stephens |
| 4,949,300 | A | 8/1990 | Christenson et al. |
| 4,979,148 | A | 12/1990 | Bush et al. |
| 5,093,778 | A | 3/1992 | Favor et al. |
| 5,299,315 | A | 3/1994 | Chin et al. |
| 5,339,424 | A | 8/1994 | Fushimi |
| 5,349,657 | A | 9/1994 | Lee |
| 5,375,242 | A | 12/1994 | Kumar et al. |
| 5,388,156 | A | 2/1995 | Blackledge, Jr. et al. |

(Continued)

FOREIGN PATENT DOCUMENTS

EP          01111679 A2    12/2000

(Continued)

OTHER PUBLICATIONS

"Server Side Java", Kaffe, Jan. 16,1998.*

(Continued)

*Primary Examiner*—Bunjob Jaroenchonwanit
*Assistant Examiner*—Dohm Chankong
(74) *Attorney, Agent, or Firm*—Merchant & Gould PC

(57) ABSTRACT

Internet web servers provide processing services, in addition to data and visual content, to provide remote clients with access to processing services located on servers. The client processes communicate with these service providing servers over a distributed network like the Internet using standard HTTP communications protocol and XML data exchange language. Client processes send an HTTP request to a remote server for processing. This processing request may contain input data that is to be used in responding to the request. The server processes the request using the input data, and possibly other data obtained from remote databases, and returns a resultant XML specified data packet. This processing requests, may be initiated using a web browser from an HTML based web page or using a smart client process that simply sends a processing request along with input data and consumes the resultant data packet. The server provides these web services accessed by the client process by allowing the client to access a URL referencing a source code file containing class specifications that may be dynamically compiled into an executable object whenever an executable object corresponding to the current version of the source code referenced by a URL does not exist on the server.

16 Claims, 14 Drawing Sheets

U.S. PATENT DOCUMENTS

| | | | |
|---|---|---|---|
| 5,434,992 A | 7/1995 | Mattson |
| 5,465,332 A | 11/1995 | Deloye et al. |
| 5,471,318 A | 11/1995 | Ahuja et al. |
| 5,517,655 A | 5/1996 | Collins et al. |
| 5,548,340 A | 8/1996 | Bertram |
| 5,550,560 A | 8/1996 | Kanada et al. |
| 5,577,253 A | 11/1996 | Blickstein |
| 5,604,908 A | 2/1997 | Mortson |
| 5,608,890 A | 3/1997 | Berger et al. |
| 5,613,117 A | 3/1997 | Davidson et al. |
| 5,638,176 A | 6/1997 | Hobbs et al. |
| 5,640,449 A | 6/1997 | Worley et al. |
| 5,649,131 A | 7/1997 | Ackerman et al. |
| 5,659,753 A | 8/1997 | Murphy et al. |
| 5,664,228 A | 9/1997 | Mital |
| 5,675,520 A | 10/1997 | Pitt, III et al. |
| 5,689,703 A | 11/1997 | Atkinson et al. |
| 5,706,505 A | 1/1998 | Fraley et al. |
| 5,727,159 A | 3/1998 | Kikinis |
| 5,732,256 A | 3/1998 | Smith |
| 5,732,267 A | 3/1998 | Smith |
| 5,745,103 A | 4/1998 | Smith |
| 5,748,890 A | 5/1998 | Goldberg et al. |
| 5,754,774 A | 5/1998 | Bittinger et al. |
| 5,764,235 A | 6/1998 | Hunt et al. |
| 5,764,236 A | 6/1998 | Tanaka |
| 5,764,873 A | 6/1998 | Magid et al. |
| 5,774,670 A | 6/1998 | Montulli |
| 5,793,982 A | 8/1998 | Shrader et al. |
| 5,802,600 A | 9/1998 | Smith et al. |
| 5,812,996 A | 9/1998 | Rubin et al. |
| 5,835,724 A | 11/1998 | Smith |
| 5,855,020 A | 12/1998 | Kirsch |
| 5,873,097 A | 2/1999 | Harris et al. |
| 5,878,141 A | 3/1999 | Daly et al. |
| 5,878,282 A | 3/1999 | Mital |
| 5,889,992 A | 3/1999 | Koerber |
| 5,892,937 A | 4/1999 | Caccavale |
| 5,897,622 A | 4/1999 | Blinn et al. |
| 5,897,644 A | 4/1999 | Nielsen |
| 5,911,068 A | 6/1999 | Zimmerman et al. |
| 5,911,145 A | 6/1999 | Arora et al. |
| 5,918,007 A | 6/1999 | Blackledge, Jr. et al. |
| 5,923,882 A | 7/1999 | Abrams et al. |
| 5,935,207 A | 8/1999 | Logue et al. |
| 5,937,409 A | 8/1999 | Wetherbee |
| 5,940,075 A | 8/1999 | Mutschler, III et al. |
| 5,940,847 A | 8/1999 | Feln et al. |
| 5,953,524 A | 9/1999 | Meng et al. |
| 5,956,489 A | 9/1999 | San Andres et al. |
| 5,961,601 A | 10/1999 | Iyengar |
| 5,963,952 A | 10/1999 | Smith |
| 5,974,430 A | 10/1999 | Mutschler, III et al. |
| 5,983,227 A | 11/1999 | Nazem et al. |
| 5,987,242 A | 11/1999 | Bentley et al. |
| 5,987,247 A | 11/1999 | Lau |
| 5,991,802 A | 11/1999 | Allard et al. |
| 5,995,753 A | 11/1999 | Walker |
| 6,006,230 A | 12/1999 | Ludwig et al. |
| 6,014,637 A | 1/2000 | Fell et al. |
| 6,014,666 A | 1/2000 | Helland et al. |
| 6,023,714 A | 2/2000 | Hill et al. |
| 6,032,207 A | 2/2000 | Wilson |
| 6,038,551 A | 3/2000 | Barlow et al. |
| 6,058,455 A | 5/2000 | Islam et al. |
| 6,059,913 A | 5/2000 | Martin et al. |
| 6,061,690 A | 5/2000 | Nori et al. |
| 6,067,413 A | 5/2000 | Gustafsson et al. |
| 6,067,578 A | 5/2000 | Zimmerman et al. |
| 6,072,664 A | 6/2000 | Aoyagi et al. |
| 6,076,108 A | 6/2000 | Courts et al. |
| 6,101,502 A | 8/2000 | Heubner et al. |
| 6,101,607 A | 8/2000 | Bachand et al. |
| 6,108,717 A | 8/2000 | Kimura et al. |
| 6,115,744 A | 9/2000 | Robins |
| 6,119,078 A | 9/2000 | Kobayakawa et al. |
| 6,119,115 A | 9/2000 | Barr |
| 6,119,155 A | 9/2000 | Rossmann et al. |
| 6,121,968 A | 9/2000 | Arcuri et al. |
| 6,121,970 A | 9/2000 | Guedalia |
| 6,122,637 A | 9/2000 | Yohe et al. |
| 6,128,623 A | 10/2000 | Mattis et al. |
| 6,138,150 A | 10/2000 | Nichols et al. |
| 6,138,171 A | 10/2000 | Walker |
| 6,151,624 A * | 11/2000 | Teare et al. ................. 709/217 |
| 6,167,438 A | 12/2000 | Yates et al. |
| 6,167,441 A | 12/2000 | Himmel |
| 6,167,524 A | 12/2000 | Goodnow et al. |
| 6,173,316 B1 | 1/2001 | De Boor et al. |
| 6,178,461 B1 | 1/2001 | Chan et al. |
| 6,185,608 B1 | 2/2001 | Hon et al. |
| 6,185,625 B1 | 2/2001 | Tso et al. |
| 6,202,199 B1 | 3/2001 | Wygodny et al. |
| 6,203,220 B1 | 3/2001 | Takenoshita et al. |
| 6,205,480 B1 | 3/2001 | Broadhurst et al. |
| 6,212,192 B1 | 4/2001 | Mirashrafi et al. |
| 6,218,958 B1 | 4/2001 | Eichstaedt et al. |
| 6,223,217 B1 | 4/2001 | Pettus |
| 6,230,160 B1 | 5/2001 | Chan et al. |
| 6,230,313 B1 | 5/2001 | Callahan, II et al. |
| 6,246,403 B1 | 6/2001 | Tomm |
| 6,246,422 B1 | 6/2001 | Emberling et al. |
| 6,247,044 B1 | 6/2001 | Gosling et al. |
| 6,249,844 B1 | 6/2001 | Schloss et al. |
| 6,253,228 B1 | 6/2001 | Ferris et al. |
| 6,253,234 B1 | 6/2001 | Hunt et al. |
| 6,279,151 B1 | 8/2001 | Breslau et al. |
| 6,282,670 B1 | 8/2001 | Rezaul Islam et al. |
| 6,286,133 B1 | 9/2001 | Hopkins |
| 6,297,819 B1 | 10/2001 | Furst |
| 6,300,947 B1 | 10/2001 | Kanevsky |
| 6,311,215 B1 | 10/2001 | Bakshi et al. |
| 6,326,957 B1 | 12/2001 | Nathan et al. |
| 6,334,126 B1 | 12/2001 | Nagatomo et al. |
| 6,334,157 B1 | 12/2001 | Oppermann et al. |
| 6,336,161 B1 | 1/2002 | Watts |
| 6,343,148 B2 | 1/2002 | Nagy |
| 6,345,279 B1 | 2/2002 | Li et al. |
| 6,351,767 B1 | 2/2002 | Batchelder et al. |
| 6,353,447 B1 | 3/2002 | Truluck et al. |
| 6,353,452 B1 | 3/2002 | Hamada et al. |
| 6,354,477 B1 | 3/2002 | Trummer |
| 6,356,283 B1 | 3/2002 | Guedalia |
| 6,363,352 B1 | 3/2002 | Dailey et al. |
| 6,370,561 B1 | 4/2002 | Allard et al. |
| 6,370,682 B1 | 4/2002 | Eckardt et al. |
| 6,373,841 B1 | 4/2002 | Goh et al. |
| 6,381,735 B1 | 4/2002 | Hunt |
| 6,397,253 B1 | 5/2002 | Quinlan et al. |
| 6,401,099 B1 | 6/2002 | Koppolu et al. |
| 6,401,132 B1 | 6/2002 | Bellwood et al. |
| 6,405,241 B2 | 6/2002 | Gosling et al. |
| 6,412,008 B1 | 6/2002 | Fields et al. |
| 6,421,717 B1 | 7/2002 | Kloba et al. |
| 6,421,733 B1 | 7/2002 | Tso et al. |
| 6,424,981 B1 | 7/2002 | Isaac et al. |
| 6,426,761 B1 | 7/2002 | Kanevsky et al. |
| 6,430,575 B1 | 8/2002 | Dourish et al. |
| 6,438,576 B1 | 8/2002 | Huang et al. |
| 6,457,030 B1 | 9/2002 | Adams et al. |
| 6,457,172 B1 | 9/2002 | Carmichael et al. |
| 6,460,071 B1 | 10/2002 | Hoffman |
| 6,460,141 B1 | 10/2002 | Olden |
| 6,463,442 B1 | 10/2002 | Bent et al. |

| | | |
|---|---|---|
| 6,466,203 B2 | 10/2002 | Van Ee |
| 6,470,381 B2 | 10/2002 | De Boor et al. |
| 6,473,609 B1 | 10/2002 | Schwartz et al. |
| 6,480,894 B1 | 11/2002 | Courts et al. |
| 6,487,665 B1 | 11/2002 | Andrews et al. |
| 6,496,692 B1 | 12/2002 | Shanahan |
| 6,505,238 B1 | 1/2003 | Tran |
| 6,509,913 B2 | 1/2003 | Martin et al. |
| 6,514,408 B1 | 2/2003 | Smith et al. |
| 6,523,027 B1 | 2/2003 | Underwood |
| 6,535,896 B2 | 3/2003 | Britton et al. |
| 6,539,421 B1 | 3/2003 | Appelman et al. |
| 6,539,501 B1 | 3/2003 | Edwards |
| 6,542,908 B1 * | 4/2003 | Ims ............................ 707/204 |
| 6,542,967 B1 | 4/2003 | Major |
| 6,546,473 B2 | 4/2003 | Cherkasova et al. |
| 6,546,516 B1 | 4/2003 | Wright et al. |
| 6,556,217 B1 | 4/2003 | Makipaa et al. |
| 6,557,038 B1 | 4/2003 | Becker et al. |
| 6,560,598 B2 | 5/2003 | Delo et al. |
| 6,560,618 B1 | 5/2003 | Ims |
| 6,560,639 B1 | 5/2003 | Dan et al. |
| 6,560,699 B1 | 5/2003 | Konkle |
| 6,563,517 B1 | 5/2003 | Bhagwat et al. |
| 6,563,913 B1 | 5/2003 | Kaghazian |
| 6,564,251 B2 | 5/2003 | Katariya et al. |
| 6,591,272 B1 | 7/2003 | Williams |
| 6,593,944 B1 | 7/2003 | Nicolas et al. |
| 6,601,233 B1 | 7/2003 | Underwood |
| 6,606,418 B2 | 8/2003 | Mitchell et al. |
| 6,609,128 B1 | 8/2003 | Underwood |
| 6,610,105 B1 | 8/2003 | Martin et al. |
| 6,622,168 B1 | 9/2003 | Datta |
| 6,633,416 B1 | 10/2003 | Benson |
| 6,643,712 B1 | 11/2003 | Shaw et al. |
| 6,678,518 B2 | 1/2004 | Eerola |
| 6,687,735 B1 | 2/2004 | Logston et al. |
| 6,697,825 B1 | 2/2004 | Underwood et al. |
| 6,704,024 B2 | 3/2004 | Robotham et al. |
| 6,704,728 B1 | 3/2004 | Chang et al. |
| 6,714,794 B1 | 3/2004 | O'Carroll |
| 6,725,219 B2 | 4/2004 | Nelson et al. |
| 6,728,421 B2 | 4/2004 | Kokemohr |
| 6,732,364 B1 | 5/2004 | Bhaskaran et al. |
| 6,738,968 B1 | 5/2004 | Bosworth et al. |
| 6,757,708 B1 * | 6/2004 | Craig et al. ................ 709/203 |
| 6,757,899 B2 | 6/2004 | Zhdankin et al. |
| 6,757,900 B1 | 6/2004 | Burd et al. |
| 6,772,261 B1 | 8/2004 | D'Antonio et al. |
| 6,772,408 B1 | 8/2004 | Velonis et al. |
| 6,782,403 B1 | 8/2004 | Kino et al. |
| 6,789,105 B2 | 9/2004 | Ludwig et al. |
| 6,792,575 B1 | 9/2004 | Samaniego et al. |
| 6,792,605 B1 * | 9/2004 | Roberts et al. ............. 719/313 |
| 6,792,607 B1 | 9/2004 | Burd et al. |
| 6,826,597 B1 | 11/2004 | Lonnroth et al. |
| 6,832,263 B2 * | 12/2004 | Polizzi et al. ............... 709/246 |
| 6,836,883 B1 | 12/2004 | Abrams et al. |
| 6,847,333 B2 | 1/2005 | Bokhour |
| 6,886,013 B1 | 4/2005 | Beranek |
| 6,892,226 B1 | 5/2005 | Tso et al. |
| 6,901,437 B1 | 5/2005 | Li |
| 6,904,600 B1 | 6/2005 | James et al. |
| 6,915,307 B1 | 7/2005 | Mattis et al. |
| 6,915,454 B1 | 7/2005 | Moore et al. |
| 6,918,107 B2 * | 7/2005 | Lucas et al. ................ 717/124 |
| 6,920,480 B2 | 7/2005 | Mitchell et al. |
| 6,922,827 B2 | 7/2005 | Vasilik et al. |
| 6,928,488 B1 | 8/2005 | de Jong et al. |
| 6,944,797 B1 | 9/2005 | Guthrie et al. |
| 6,948,174 B2 | 9/2005 | Chiang et al. |
| 6,950,875 B1 * | 9/2005 | Slaughter et al. ........... 709/227 |
| 6,954,751 B2 | 10/2005 | Christfort et al. |
| 6,954,854 B1 | 10/2005 | Miura et al. |
| 6,961,750 B1 | 11/2005 | Burd et al. |
| 6,961,754 B2 | 11/2005 | Christopoulos et al. |
| 6,961,776 B1 | 11/2005 | Buckingham et al. |
| 6,964,009 B2 | 11/2005 | Samaniego et al. |
| 6,970,935 B1 | 11/2005 | Maes |
| 6,990,653 B1 | 1/2006 | Burd et al. |
| 7,013,340 B1 | 3/2006 | Burd et al. |
| 7,016,963 B1 | 3/2006 | Judd et al. |
| 7,028,312 B1 | 4/2006 | Merrick et al. |
| 7,076,786 B2 | 7/2006 | Burd et al. |
| 7,099,870 B2 | 8/2006 | Hsu et al. |
| 7,117,504 B2 | 10/2006 | Smith et al. |
| 7,151,966 B1 * | 12/2006 | Baier et al. ................. 709/203 |
| 7,159,007 B2 * | 1/2007 | Stawikowski ............... 709/202 |
| 7,162,723 B2 | 1/2007 | Guthrie et al. |
| 7,171,443 B2 | 1/2007 | Tiemann et al. |
| 7,171,454 B2 * | 1/2007 | Nguyen ...................... 709/218 |
| 7,181,731 B2 * | 2/2007 | Pace et al. .................. 709/218 |
| 7,188,112 B1 * | 3/2007 | Lindquist et al. ............ 709/203 |
| 7,188,155 B2 * | 3/2007 | Flurry et al. ................. 709/219 |
| 7,216,294 B2 | 5/2007 | Gibbs et al. |
| 2001/0013070 A1 | 8/2001 | Sasaki |
| 2001/0027474 A1 | 10/2001 | Nachman et al. |
| 2001/0037404 A1 | 11/2001 | Hafsteinsson et al. |
| 2001/0047385 A1 | 11/2001 | Tuatini |
| 2001/0054020 A1 | 12/2001 | Barth et al. |
| 2002/0004815 A1 | 1/2002 | Muhlestein et al. |
| 2002/0008703 A1 | 1/2002 | Merrill et al. |
| 2002/0032701 A1 | 3/2002 | Gao et al. |
| 2002/0055878 A1 | 5/2002 | Burton et al. |
| 2002/0056085 A1 | 5/2002 | Fahraeus |
| 2002/0062396 A1 | 5/2002 | Kakei et al. |
| 2002/0073163 A1 | 6/2002 | Churchill et al. |
| 2002/0078101 A1 | 6/2002 | Chang et al. |
| 2002/0078144 A1 | 6/2002 | Lamkin et al. |
| 2002/0083171 A1 | 6/2002 | Hoogenboom et al. |
| 2002/0095445 A1 | 7/2002 | alSafadi et al. |
| 2002/0107891 A1 | 8/2002 | Leamon et al. |
| 2002/0108102 A1 | 8/2002 | Muhlestein et al. |
| 2002/0116534 A1 | 8/2002 | Teeple |
| 2002/0120677 A1 | 8/2002 | Goward et al. |
| 2002/0120753 A1 | 8/2002 | Levanon et al. |
| 2002/0129016 A1 | 9/2002 | Christfort et al. |
| 2002/0133635 A1 | 9/2002 | Schechter et al. |
| 2002/0138331 A1 | 9/2002 | Hosea et al. |
| 2002/0152244 A1 | 10/2002 | Dean et al. |
| 2002/0161928 A1 | 10/2002 | Ndili |
| 2002/0161938 A1 | 10/2002 | Bonomo et al. |
| 2002/0188890 A1 | 12/2002 | Shupps et al. |
| 2002/0194227 A1 | 12/2002 | Day et al. |
| 2003/0004998 A1 | 1/2003 | Datta |
| 2003/0009476 A1 | 1/2003 | Fomenko et al. |
| 2003/0009519 A1 | 1/2003 | Gosling et al. |
| 2003/0009567 A1 | 1/2003 | Farouk |
| 2003/0018827 A1 | 1/2003 | Gutherie et al. |
| 2003/0025728 A1 | 2/2003 | Ebbo et al. |
| 2003/0028565 A1 | 2/2003 | Landsman et al. |
| 2003/0028892 A1 | 2/2003 | Gewickey et al. |
| 2003/0066056 A1 | 4/2003 | Petersen et al. |
| 2003/0074634 A1 | 4/2003 | Emmelmann |
| 2003/0097639 A1 | 5/2003 | Niyogi et al. |
| 2003/0110234 A1 | 6/2003 | Egli et al. |
| 2003/0128235 A1 | 7/2003 | Chernow et al. |
| 2003/0187952 A1 | 10/2003 | Young et al. |
| 2003/0204622 A1 * | 10/2003 | Blizniak et al. ............. 709/241 |
| 2003/0233477 A1 | 12/2003 | Ballinger et al. |
| 2004/0003112 A1 | 1/2004 | Alles et al. |
| 2004/0003117 A1 | 1/2004 | McCoy et al. |
| 2004/0003139 A1 | 1/2004 | Cottrille et al. |
| 2004/0003248 A1 | 1/2004 | Arkhipov |
| 2004/0012627 A1 | 1/2004 | Zakharia et al. |
| 2004/0015879 A1 | 1/2004 | Pauw et al. |

| | | | |
|---|---|---|---|
| 2004/0030740 | A1* | 2/2004 | Stelting .................. 709/201 |
| 2004/0073873 | A1 | 4/2004 | Croney et al. |
| 2004/0172484 | A1 | 9/2004 | Hafsteinsson et al. |
| 2004/0189693 | A1 | 9/2004 | Kenig |
| 2004/0218045 | A1 | 11/2004 | Bodnar et al. |
| 2004/0230958 | A1 | 11/2004 | Alaluf |
| 2005/0050164 | A1 | 3/2005 | Burd et al. |
| 2005/0091230 | A1 | 4/2005 | Ebbo et al. |
| 2005/0171967 | A1 | 4/2005 | Yuknewicz |
| 2005/0138560 | A1 | 6/2005 | Lee et al. |
| 2005/0162439 | A1 | 7/2005 | Bates et al. |
| 2005/0193097 | A1 | 9/2005 | Guthrie et al. |
| 2005/0203890 | A1 | 9/2005 | Chen et al. |
| 2005/0229186 | A1* | 10/2005 | Mitchell et al. ............. 719/315 |
| 2005/0251380 | A1 | 11/2005 | Calvert et al. |
| 2005/0256834 | A1 | 11/2005 | Millington et al. |
| 2005/0256924 | A1 | 11/2005 | Chory et al. |
| 2005/0256933 | A1 | 11/2005 | Millington et al. |
| 2005/0257138 | A1 | 11/2005 | Chory et al. |
| 2005/0268292 | A1 | 12/2005 | Ebbo et al. |
| 2005/0278351 | A1 | 12/2005 | Niyogi et al. |
| 2006/0004910 | A1 | 1/2006 | Bard et al. |
| 2006/0020883 | A1 | 1/2006 | Kothari et al. |
| 2006/0112336 | A1 | 5/2006 | Gewickey et al. |
| 2006/0130038 | A1* | 6/2006 | Claussen et al. ............ 717/168 |
| 2007/0005795 | A1 | 1/2007 | Gonzalez |
| 2007/0033533 | A1 | 2/2007 | Sull |
| 2007/0174845 | A1 | 7/2007 | Guthrie et al. |

FOREIGN PATENT DOCUMENTS

| | | |
|---|---|---|
| EP | 1156415 | 11/2001 |
| EP | 1156427 | 11/2001 |
| EP | 1156428 | 11/2001 |
| EP | 1156429 | 11/2001 |
| EP | 1164473 | 12/2001 |
| EP | 01111678.7-2001 | 4/2002 |
| EP | 01111680.3-2201 | 4/2002 |
| EP | 01111681.1-2201 | 4/2002 |
| EP | 01111682.9-2201 | 4/2002 |
| EP | 1156427 | 11/2007 |
| EP | 1156428 | 11/2007 |
| EP | 1156429 | 11/2007 |
| GB | 1367741 | 9/1974 |
| GB | 2339374 A | 1/2000 |
| JP | 11-98134 | 4/1999 |
| JP | 2002-24079 | 1/2002 |
| JP | 2002-41299 | 2/2002 |
| JP | 2002-49484 | 2/2002 |
| JP | 2002-49585 | 2/2002 |
| JP | 2002-49848 | 2/2002 |
| WO | WO98/21651 | 5/1998 |
| WO | WO98/44695 | 10/1998 |
| WO | WO99/34288 | 7/1999 |
| WO | WO0127783 A | 4/2001 |
| WO | WO 0127783 A | 4/2001 |
| WO | WO01755667 A | 10/2001 |
| WO | WO 01755667 A | 10/2001 |
| WO | WO 0221343 A | 3/2002 |
| WO | WO02213434 A | 3/2002 |
| WO | WO 02213434 A | 3/2002 |

OTHER PUBLICATIONS

"Java Script Language—Chapter 1 Introduction", Netscape Communications, Apr. 23, 2001.*
"Microsoft Professional Developers Conference Summary", Tuecke, 1996.*
"XML RPC Specification", Dave Winer, Jun. 15, 1999.*
"Metadata Activity Statement", Feb. 2001, W3C.*
"Web Services Description Language (WSDL)", Mar. 2001, W3C.*
W3C's "Metadata Activity Statement," http://web.archive.org/web/20000616163950/http://www.w3.org/Metadata/Activity.html, May 8, 2000, pp. 1-5.*
Wu, Dapeng; Hou, Yiwci Thomas; Zhang, Ya-Qin; "Scalable Video Transport over Wireless IP Networks"; IEEE 2000; pp. 1185-1191.
Dobson, Rick; "Data Binding in Dynamic HTML"; DBMS Mar. 1998 pp. 47-52.
Penn, Gerald; Hu Jianying; Luo, Hengbin; McDonald, Ryan; "Flexible Web Document Analysis for Delivery to Narrow-Bandwidth Devices"; IEEE 2001; pp. 1074-1078.
Esposito, Dino; "Heaven Sent"; Developer Network Journal issue Mar. 23/Apr., 2001 pp. 18-24.
Hovanes, Michael E.; Deal, John R. Grizz; Rowberg, Alan H.; "Seamless Multiresolution Display of Portable Wavelet-Compressed Images" Journal of Digital Imaging, vol. 12, No. 2, suppl 1 (May), 1999, pp. 109-111.
Ingham; David B; "W3Objects: A Distributed Object-Oriented Web Server" Object-Oriented Web Servers and data Modeling Workshop, Sixth International World Wide Web Conference, Apr. 7, 1997, Santa Clara, CA 4 pages.
Kunz, T.; El Shentenawy, M.; Gaddah, A.; Hafez, R.; Image Transcoding for Wireless WWW Access: The User Perspective; Multimedia Computing and Networking 2002, Proceedings of SPIE vol. 467 (2002) pp. 28-33.
"OOP Launches Hammock at JavaOne" http://www.oop.com/pr2000_06_08.jsp?gui=Plain Jun. 8, 2000, 1 page.
"Hammock: Think of it as Swing for the Web"; Jul. 14, 2000; 10 pages.
Hammond, Eric "Hammock Swings through Web interfaces" www.infoworld.com/articles/mt/xml/00/07/17/000717mthammock.xml; Jul. 14, 2000; 3 pages.
Duan, Nick N.; "Distributed Database Access in a Corporate Environment Using Java" Bell Atlantic Corporation; 1996; 8 pages.
Nadamoto, Akiyo; Kondo, Hiroyuki; Tanaka, Katsumi; "WebCarousel: Restructuring Web Search Results for Passive Viewing in Mobile Environments" IEEE 2001 pp. 164-165.
Developing ASP-Based Applications: Microsoft 1996, 5 pages.
"ColdFusion: Web Application Server"; Allair Corp; www.allair.com; 1995-1999.
"Alterego Networks Introduces First Mobile Web Server for Enterprises, Telcos and Providers"; Redwood City, CA; Nov. 14, 2000; 3 pages.
"Bluestone Software Layes Foundation for Internet Operating Environment with Total-E-Server . . . " Screaming Media, Business Wire; Jun. 5, 2000; 3 pages.
Stewart, Tony; "The Document as Application: Issues and Implications" GCA XML Europe 1999; pp. 575-599.
Franklin, Keith; "Supercharge Data Binding"; Visual Basic Programmer's Journal, Mar. 2000; 7 pages.
Shapiro, Marc; "A Binding Protocol for Distributed Shared Objects" Presented at 14th International Conference on Distributed Comp. Sys.; Jun. 21-24, 1994; 17 pages.
"Best Practices for the Microsoft Mobile Internet Toolkit Image Control"; Microsoft Corporation, Feb. 2002.
Marshall, James; "HTTP Made Really Easy: A Practical Guide to Writing Clients and Servers"; Aug. 15, 1997; 14 pages.
Title: A Preview of Active Server pages+.
Authors: Richard Anderson, Alex Homer, Rob Howard, Dave Sussman Copyright: 2000 Wrox Press pp. 1-73.
"Best Practics for Creating Adaptive User Interfaces with the Mobile Internet Toolkit"; Microsoft Corporation, Jan. 2002; 15 pages.
"HTML Encyclopaedia"; http://www.scit.wlv.ac.uk/encyc/form.html; 2 pages.
Hannay, Phillip et al., "MSIL For the. NET Framework: The Next Battleground?", Virus Bulletin Conference, Sep. 2001, pp. 173-196.
"NCSA httpd" nttpd@ncsa.uiuc.edu.
Pyarali, Irfan; O'Ryan, Carlos; Schmidt, Douglas; Wang, Nanbor; Gokhale, Aniruddha S.; Kachroo, Vishal; "Using Priciple Patterns to Optimize Real-Time ORB's" IEEE Concurrency, 2000, pp. 16-25.
"Best Practices for Creating Adaptive User Interfaces with the Mobile Internet Toolkit"; Microsoft Corporation, Jan. 2002; 15 pages.
"HTML Encyclopaedia"; http://www.scit.wlv.ac.uk/encyc/form.html; 2 pages; Accessed via URL Dec. 28, 2004.
Custer, Helen; "Inside Windows NT"; Microsoft Press 1993; pp. 74-81.

Davulcu, Hasan; Freire, Juliana; Kifer, Michael; Ramakrishnan, I.V.; "A Layered Architecture for Querying Dynamic Web Content"; ACM 1999; pp. 491-502.

Dowd, Tyson et al., "Compiling Mercury to the .NET Common Language Runtime," Electronic Notes in Theoretical Computer Sciences 59 No. 1 (Netherlands) (2001), pp. 1-16.

Frost, Jim: "Windows NT Security"; May 4, 1995; 7 pages; http://world.std.com/-jimf/papers/nt-security/nt-security.html.

Hannay, Phillip et al., "MSIL For the .NET Framework: The Next Battleground?", Virus Bulletin Conference, Sep. 2001, pp. 173-196.

Holmes, John W.; e-Mail response to question regarding GET/POST. HTTP request, extracted from GOOGLE's News Groups, php.general, Nov. 11, 2002.

Kitayama, Fumihiko; Hirose, Shin-Ichi; Kondoh, Goh; Kuse, Kazushi; "Design of a Framework for Dynamic Content Adaptation to Web-Enabled Terminals and Enterprise Applications"; IEEE 1999, pp. 72-79.

Langheinrich, M., et al., "Unintrusive customization techniques for Web advertising," Computer Networks, vol. 31, No. 11-16. May 17, 1999, pp. 1259-1272.

Lee, C.,-H., et al., "Web personalization expert with combining collaborative filtering and association rule mining technique," Expert Systems With Applications, Vo. 21, No. 3, Oct. 2001, pp. 131-137.

Li, W.-S., et al., "PowerBookmarks: a system for personalizable Web Information organization, sharing, and management, " Computer Networks, vol. 31, No. 11-16, May 17, 1999, pp. 1375-1389.

Mobasher, B., "A Web personalization Engine Based on User Transaction Clustering," Proc. Of the 9th Annual Workshop on Information Tech. And Systems, Dec. 11, 1999, pp. 179-184.

"NCSA httpd" nttpd@ncsa.uiuc.edu, web page last modified Sep. 11, 1995.

O'Leary, M., "Web personalization Does It Your Way," O'Leary Online, vol. 23, No. 2, Mar.-Apr. 1999, pp. 79-80.

Pyarali, Irfan; O'Ryan, Carlos, Schmidt, Douglas; Wang, Nanbor; Gokhale, Aniruddha S.; Kachroo, Vishal; "Using Priciple Patterns to Optimize Real-Time ORB's" IEEE Concurrency, 2000, pp. 16-25.

Ramakrishnan, N., "PIPE: Web Personalization by Partial Evaluation," IEEE Internet Computing, vol. 4, No. 6, Nov.-Dec. 2000, pp. 21-31.

Seddon, Bill, "Generating XP Style webparts from a web control," The Code Project—Generating XP sytle webparts from a web control—ASP.NET, online at http://www.codeproject.com/aspent/webpartscontol.asp, retrieved Apr. 8, 2004, 10 pages.

Sells, Chris et al., "Generating Code at Run Time with Reflection. Emit," Windows Developer Magazine, Aug. 2002, vol. 13, No. 8, pp. 26-34.

Shi, Weisong; Collins, Eli; Karamcheti, Vijay; "Modeling Object Characteristics of Dynamic Web Content"; Proceedings of the IEEE Global Internet Conference, Nov. 2002, 5 pgs.

Soloman, David A. "Inside Windows NT, Second Edition"; Microsoft Press 1998; pp. 310-319.

Syme, Don, "ILX: Extending the .NET Common IL for Functional Language Interoperability," Electronic Notes in Theoretical Computer Science 59 No. 1 (2001), pp. 1-20.

Varela, Carlos A.; Caroline C. Hayes; "Providing Data on the Web: From Examples to Programs," Second International WWW Conference, Chicago, IL; Oct. 17, 1994; 17 pages.

Chapter 3, "Mechanics of Developing JavaScript Applications"; Server-Side Javascript Guide; Online! 1999; pp. 51-108 www.developer.netscape.com/docs/mauals/ssjs/1_4/ssjs.pdf.

Chapter 6, "Session Mangement Service"; Server Side Javascript Guide; Online! 1999 pp. 125-166, www.developer.netscape.com/docs/manuals/ssjs/1_4/ssjs.pdf.

"A Brief History of Hypertext" Microsoft Corporation, 1996, 1 page.

"HTML Encyclopaeida"; http://www.scit.wiv.ac.uk/encyc/form.html; 2 pages, accessed via URL Aug. 28, 2003.

U.S. Appl. No. 09/570,071, filed May. 12, 2000, Smith et al.

U.S. Appl. No. 09/899,539, filed Jul. 6, 2001, Ebbo et al.

U.S. Appl. No. 11/158,816 filed Jun. 21, 2005, Moore et al.

U.S. Appl. No. 11/184,094, filed Jul. 18, 2005, Guthrie et al.

"Spyglass Prism 3.1 Supports the latest Standards for Transmission of Content to Wireless Devices," Internet citation, Jul. 5, 1000.

Abrams et al., "UML an applicance-independent XML user inteface language," Computer Netwroks, Elsevier Science Publishes B.V., Amsterdam, NL, vol. 31, No. 11-16, May 17, 1999, pp. 1695-1708.

Abrams, Marc et al., "UIML: An XML Language for building Device-Independent User Interfaces," XML Conference Proceedings. Proceedings of XML, Dec. 1999 (Dec. 1999).

Aggarwal, Charu et al., "Caching on the World Wide Web" IEEE Transactions on Knowledge and Data Engineering, vol. 11, No. 1, Jan./Feb. 1999. pp. 94-107.

Alves Dos Santooa, L.M., "Multimedia Data and tools for Web services over Wireless Platforms," IEEE Personal.

Communications, Oct. 1998, pp. 42-46.

Ballinger, "Fun with SOAP Extensions", Mar. 2001, MSDN, pp. 1-5.

Ciancarini et al., "An extensible rendering engine for XML and HTNL", Computer Networks and ISDN System, North Holland Publishing, vol. 30, No. 1-7, Apr. 1998, pp. 225-237.

Davidson, et al., "Schema for Object-Oriented IML 2.0", Jul. 1999, W3 Consortium, pp. 1-29.

European Search Report EP 02 00 5786 (MG 40062.0255EPU1) date unknown.

Flammia, G., "The Wireless Internet Today and Tomorrow," IEEE Intelligent Systems, [Online] vol. 15, Sep. 2000 (Sep. 2000), pp. 82-83.

Heins, et al., "Taking Your Information Into the Wireless World: Developing Information for Delivery to Mobile Devices", IEEE, pp. 237-244, Oct. 2001.

Howard, "Web Services with ASP.NET", Feb. 2001, MSDN, pp. 1-9.

Kaasinen Eija et al.: "Two approaches to bringing internet services to WAP devices," Computer Networks and ISDN Systems, North Holland Publishing, Amsterdam, NL, vol. 33, No. 1, 2000, pp. 231-246.

Kagal, et al., "Centaurus: A Framework for Intelligent Services in a Mobile Environment", Computer Science and Electrical Engineering, IEEE, pp. 195-2001, Apr. 2001.

Kirda, "Web Engineering Device Independent Web Services", Distributed Systems Group, IEEE, pp. 795-796, May 2001.

Krikelis, A., "Mobile multimedia: sharping the Inforverse", IEEE Concurrency, Jan.-Mar. 1999, pp. 7-9.

Moore, M M, et al. "Migrating legacy user interfaces to the internet: shifting dialogue initiative", IEEE, Nov. 23, 2000, pp. 52-58.

Muller-Wilken S. et al.; "On integrating mobile devices into a workflow management scenario," Database and Expert Systems Applications, 2000. Procceedings 11th International Workshop on Sep. 4-8, 2000, Piscataway, NJ, USA, IEEE, pp. 186-190.

Partial European Search Report for EP 02 00 5786 (MG 40062.0255EPU1) date unknown.

Platt,"Thunderclap, the Newsletter of Rolling Thunder Computing", dated to Aug. 2001, vol. 3, No. 2, pp. 1-18.

Ren, Robin, "Practical Active Server Pages Technique: Porting Windows CGI Applications to ASP", Microsoft Interactive Developer, No. 10, pp. 89-98, ASCII Corporation, Nov. 18, 1998 (CSDB: Technical Journal in Japan 2000001200009).

W3C, SOAP Version 1.2 Specification Jul. 9, 2001 Working Draft, Jul. 2001.

Yoshikawa, Kazuhiro, et al. "Expanding a System via the Internet: Construction/Operation Points to be Considered: Exploring a Construction/Operation for Improving Reliability and Security", Nikkei Open Systems, No. 63, pp. 182-191, Nikkei Business Publications, Inc., Jun. 15, 1998 (CSBD: Technical Journal in Japan 199800933009).

A.D. Gordon and D Syme, *Typing a Multi-Language Intermediate Code*, submitted to The 28th ACM Principles of Programming Languages, (Feb. 2001), pp. 1-9.

European Search Report for EP 01115100. date unknown.

Fabre, Christian et al., *Java-ANDF Feasibility Study Final Report*, Mar. 26, 1997.

Gosling, J. et al., *The Java Language Environment*, A White Paper, Sun Microsystems Computer Company, Oct. 1, 1995 pp. 1, 4-85.

Henglein, Fritz & Jorgensen, Jesper, *Formally Optimal Boxing*, Proceedings of the 21st ACM Sigplan-Sigact Symposium on Principles of Programming Languages, 1994, pp. 213-216.

Johnson, Andrew et al., *The ANDF Technology Program at the OSF RI*; Dec. 8, 1992.

Lindholm, Tim & Yellin, Frank, *The Java Virtual Machine Specification, Second Edition*, Sun Microsystems, 1999, Ch. 2, pp. 1-44.

M. Tofte and J.P. Talpin, *Region-Based Memory Management, Information and Computation*, 1997, vol. 132(2), pp. 109-176.

Manual page of AR, Free Software Foundation, 1999. Retreived from Internet on Feb. 20, 2008. Retrieved from URL: <http://www.freebsd.org/cgi/man.cgi?query=ar&apropos=0&sektion=0&manpath=FreeBSD+4.8-RELEASE&format=html>.

Manual page of GCC, Free Software Foundation, 1998. Retrieved from Internet on Feb. 20, 2008. Retrieved from URL: <http://www.freebsd.org/cgi/man.cgi?query=gcc&apropos=0&sektion=0&manpath=FreeBSD+4.8-RELEASE&format=html>.

Peeling, Dr. N.E., *ANDF Features and Benefits*, Feb. 5, 1993.

Rational, Rose/C++, Rational Software Corporation, whole manual, released 1996.

S. Peyton Jones and J. Launchbury, *Unboxed Values as First Class Citizens*, In Functional Programming Languages and Computer Architecture, vol. 523 of Lecture Notes in Computer Science, Springer Verlag, 1991, pp. 636-666.

Shao, Zhong, *Flexible Representation Analysis*, Proceedings of the Second ACM SIGPLAN International Conference on Functional Programming, 1997, pp. 85-98.

SNAP Using the SNAP Language, Template Software, Chapter 7, published 1997.

Software Construction with Examples in ADA, Bo Sanden, published 1994, pp. 104-109.

Standard Output of Comman, 'ar': contents of '/usr/lib/libbz2.a', print out of files in '/usr/lib/libbz2.z'.

Thiemann, Peter, *Unboxed Values and Polymorphic Typing Revisiting*, Proceedings of the Seventh International Conference On Functional Programming Languages and Computer Architecture, 1995, pp. 24-35.

Visual Object-Oriented Programming, M. Burnett et al., pp. 1-42, 199-274, published 1994.

X. Leroy, *Unboxed Objects and Polymorphic*, in 19th ACM SIGPLAN-SIGACT Symposium on Principles of Programming Languages, ACM Press, 1992, pp. 177-188.

Y.G. Park and B. Goldberg, *Escape Analysis On Lists*, in ACM SIGPLAN on Programming Language Design and Implementation, ACM Press, 1992, pp. 116-127.

Office Action dated Jun. 6, 2003, in U.S. Appl. No. 09/574,165.

Office Action dated Dec. 4, 2003 in U.S. Appl. No. 09/574,165.

Office Action dated Mar. 30, 2004 in U.S. Appl. No. 09/574,165.

Office Action dated Oct. 22, 2004 in U.S. Appl. No. 09/574,165.

Office Action dated Jan. 2, 2008 in U.S. Appl. No. 11/120,511.

Office Action dated Dec. 1, 2005 in U.S. Appl. No. 10/174,348.

Office Action dated Jun. 19, 2006 in U.S. Appl. No. 10/174,348.

Office Action dated Dec. 21, 2006 in U.S. Appl. No. 10/174,348.

Kagel, et al., "Centaurus: A Framework for Intelligent Services in a Mobile Environment", Computer Science and Electrical Engineering, IEEE, pp. 195-201, Apr. 2001.

Kirda, "Web Engineering Device Independent Web Services", Distributed Systems Group, IEEE, pp. 795-796, May 2001.

Kitayama, Fumilhiko; Hirose, Shin-Ichi; Kondoh, Goh; Kuse, Kazushi; "Design of Framework for Dynamic Content Adaptation to Web-Enabled Terminals and Enterprise Applications"; IEEE 1999, pp. 72-79.

Krikelis, A., "Mobile multimedia: shapring the Inforverse", IEEE Concurrency, Jan.-Mar. 1999, pp. 7-9.

Kunz, T.; El Shentenawy, M.; Gaddah, A.; Hafez, R.; Image Transcoding for Wireless WWW Access: The User Perspective; Multimedia Computing and Networking 2002, Proceedings of SPIE vol 467 (2002) pp. 28-33.

Langheinrich, M., et al., "Unintrusive customization techniques for Web advertising," Computer Networks, vol. 31, No. 11-16. May 17, 1999, pp. 1259-1272.

Lee, C.-H., et al., "Web personalization expert with combining collaborative filtering and association rule mining technique," Expert Systems With Applications, vol. 21, No. 3, Oct. 2001, pp. 131-137.

Li, W.-S., et al., "PowerBookmarks: a system for personalizable Web information organization, sharing, and management," Computer Networks, vol. 31, No. 11-16, May 17, 1999, pp. 1375-1389.

Marshall, "HTTP Made Really Easy - A Practical Guide to Writing Clients and Servers", Aug. 15, 1997.

"Metadata Activity Statement", Feb. 2001, W3C.

Mobasher, B., "A Web personalization Engine Based on User Transaction Clustering," Proc. Of the 9th Annual Workshop on Information Tech. And Systems, Dec. 11, 1999, pp. 179-184.

Moore, M M, et al. "Migrating legacy user interfaces to the internet: shifting dialogue initiative", IEEE, Nov. 23, 2000, pp. 52-58.

Muller-Wilken S. et al.; "On integrating mobile devices into a workflow management scenario," Database and Expert Systems Applications, 2000. Proceedings 11th International Workshop on Sep. 4-8, 2000, Piscataway, NJ, USA, IEEE, pp. 186-190.

Nadamoto, Akiyo; Kondo, Hiroyuki; Tanaka, Katsumi; "WebCarousel: Restructuring Web Search Results for Passive Viewing in Mobile Environments" IEEE 2001 p. 164-165.

"NCSA httpd" nttpd@ncsa.uiuc.edu date unknown.

O'Leary, M., "Web personalization Does It Your Way," O'Leary Online, vol. 23, No. 2, Mar.-Apr. 1999, pp. 79-80.

OOP Launches Hammock at JavaOne (1 page) date unknown.

Partial European Search Report for EP 02 00 5786 (MG 40062. 0255EPU1) date unknown.

Penn, Gerald; Hu Jianying; Luo, Hengbin; McDonald, Ryan; "Flexible Web Document Analysis for Deliver to Narrow-Bandwidth Devices"; IEEE 2001; pp. 1074-1078.

Platt, "Thunderclap, the Newsletter of Rolling Thunder Computing", dated to Aug. 2001, vol. 3, No. 2, pp. 1-18.

Pyarali, Irfan; O'Ryan, Carlos; Schmidt, Douglas; Wang, Nanbor; Gokhale, Aniruddha S.; Kachroo, Vishal; "Using Princple Patterns to Optimize Real-Time ORB's " IEEE Concurrency, 2000, pp. 16-25.

Ramakrishnan, N., "PIPE: Web Personalization by Partial Evaluation," IEEE Internet Computing, vol. 4, No. 6, Nov.-Dec. 2000, pp. 21-31.

Ren, Robin, "Practical Active Server Pages Technique: Porting Windows CGI Applications to ASP", Microsoft Interactive Developer, No. 10, pp. 89-98, ASCII Corporation, Nov. 18, 1998 (CSDB: Technical Journal in Japan 2000001200009).

Seddon, Bill, "Generating XP Style webparts from a web control," The Code Project - Generating XP style webparts from a web control - ASP.NET, online at http://www.codeproject.com/aspnet/webpartscontrol.asp, retrieved Apr. 8, 2004, 10 pages.

Sells, Chris et al., "Generating Code at Run Time with Reflection. Emit," Windows Developer Magazine, Aug. 2002, vol. 13, No. 8, pp. 26-34.

Shaprio, M., "A Binding Protocol for Distributed Shared Objects," Proceedings of the International Conference on Distributed Computing Systems, Poznan, Poland, Jun. 21-24, 1994, Los Alamitos , IEEE COMP. SOC. PRESS.

Shi, Weisong; Collins, Eli; Karamcheti, Vijay; "Modeling Object Characteristics of Dynamic Web Content"; Proceedings of the IEEE Global Internet Conference, Nov. 2002, 5 pgs.

Solomon, David A. "Inside Windows NT, Second Edition"; Microsoft Press 1998; pp. 310-319.

"Spyglass Prism 3.1 Supports the latest Standards for Transmisson of Content to Wireless Devices," Internet citation, Jul. 5, 1000.

Stewart, Tony: "The Document as Application: Issues and Implications" GCA XML Europe 1999; pp. 575-599.

Syme, Don, "ILX: Extending the .NET Common IL for Functional Language Interoperability," Electronic Notes in Theroratical Computer Science 59 No. 1 (2001), pp. 1-20.

Tuecke, "Microsoft Professional Developers Conference Summary", 1996.

Varela, Carlos A.; Caroline C. Hayes; "Providing Data on the Web: From Examples to Programs," Second International WWW Conference, Chicago, IL; Oct. 17, 1994; 17 pages.

W3C, SOAP Version 1.2 Specification Jul. 9, 2001 Working Draft, Jul. 2001.

"Web Services Description Language (WSDL)", Mar. 2001, W3C.

Winer, Dave, "XMP RPC Specification", Jun. 15, 1999.

Wu, Dapeng; Hou, Yiwci Thomas-Zhang, Ya-Qin; "Scalable Video Transport over Wireless IP Networks"; IEEE 2000; pp. 1185-1191.

Yoshikawa, Kazuhiro, et al. "Expanding a System via the Internet: Construction/Operation Points to be Considered: Exploring a Construction/Operation for Improving Reliability and Security", Nikkei Open Systems, No. 63, pp. 182-191, Nikkei Business Publications, Inc., Jun. 15, 1998 (CSBD: Technical Journal in Japan 199800933009).

Abrams et al., "UIML an applicance-independent XML user inteface language," Computer Networls, Elsevier Science Publishes B.V., Amsterdam, NL, vol. 31, No. 11-16, May 17, 1999 pp. 1695-1708.

Abrams, Marc et al., "UIML: An XML Language for building Device-Independent User Interfaces," XML Conference Proceedings. Proceedings of XML, Dec. 1999 (Dec. 1999).

"A Brief History of Hypertext", from Microsoft Corporation © 1996.

Aggarwal, Charu et al., "Caching on the World Wide Web" IEEE Transactions on Knowledge and Data Engineering, vol. 11, No. 1, Jan./Feb. 1999. pp. 94-107.

"Alterego Networks Introduces First Mobile Web Server for Enterprises, Telcos and Providers"; Redwood City, CA; Nov. 14, 2000; 3 pages.

Alves Dos Santooa, L.M., "Multimedia Data and tools for Web services over Wireless Platforms," IEEE Personal Communications, Oct. 1998, pp. 42-46.

Ballinger, "Fun with SOAP Extensions", Mar. 2001, MSDN, pp. 1-5 date unknown.

"Best Practices for Creating Adaptive User Interfaces with the Mobile Internet Toolkit"; Microsoft Corporation, Jan. 2002; 15 pages.

"Best Practices for the Microsoft Mobile Internet Toolkit Image Control"; Microsoft Corporation, Feb. 2002.

"Bluestone Software Lays Foundation for Internet Operating Environment with Total-E-Server . . . " Screaming Media, Business Wire; Jun. 5, 2000; 3 pages.

Chapter 1 Introduction - "Java Script Language", Netscape Commuunications, Apr. 23, 2001.

Chapter 3, "Mechanics of Developing JavaScript Applications," Server-Side Javascript Guide, Online! 1999, pp. 51-108, www.Developer.netscape.com/docs/manuals, ssjs/1_4/ssjs.pdf>.

Chapter 6, "Session Management Service," Server-Side Javascript Guide, 'Online! 1999, pp. 125-166, www.developer.netscape.com/docs/manuals/ssjs/1_4/ssjs.pdf>.

Ciancarini et al., "An extensible rendering engine for XML and HTNL", Computer Networks and ISDN System, North Holland Publishing, vol. 30, No. 1-7, Apr. 1998, pp. 225-237.

"ColdFusion Wed Application Serve"r, update and summary, from Allaire Corp - www.@allaire.com date unknown.

Custer, Helen; "Inside Windows NT"; Microsoft Press 1993; pp. 74-81.

Davidson, et al., "Schema for Object-Oriented IML 2.0", Jul. 1999, W3 Consortium, pp. 1-29.

Davulcu, Hasan ; Freire, Juliana; Kifer, Michael; Ramakrishnan, I.V.; "A Layered Architecture for Querying Dynamic Web Content"; ACM 1999; pp. 491-502.

"Developing ASP-Based Applications"from Microsoft Corporation © 1996.

Dobson, R., "Data Binding in Dynamic HTML," DBMS MAG, 'Online! Mar. 1998 (Mar. 1983) pp. 47-52.

Dowd, Tyson et al., "Compiling Mercury to the .NET Common Language Runtime," Electronic Notes in Theoretical Computer Sciences 59 No. 1 (Netherlands) (2001), pp. 1-16.

Duan, Nick N.; "Distributed Database Access in a Corporate Environment Using Java" Bell Atlantic Corporation; 1996; 8 pages.

Esposito, Dino, "Heaven sent," Developer Network Journal, Mar.-Apr. 2001, Matt Publishing, UK, No. 23, pp. 18-24.

European Search Report EP 02 00 5786 date unknown.

Flammia, G., "The Wireless Internet Today and Tomorrow," IEEE Intelligent Systems, [Online] vol. 15, Sep. 2000 (Sep. 2000), pp. 82-83.

Franklin, K., "Supercharge Data Binding," Visual Basic Programmer's Journal, Mar. 2000, Fawcette Technical Publications, vol. 10, No. 3, pp. 32-33, 39-40, 42, 44, 46.

Frost, Jim: "Windows NT Security"; May 4, 1995; 7 pages; http://world.std.com/~jimf/papers/nt-security/nt-security.html.

Hammock(TM), Think of it as Swing(TM) for the Web (10 pages) date unknown.

Hammond, Eric, "Hammock swings through Web Interfaces" (3 pages) date Unknown.

Hannay, Phillip et al., "MSIL For the .Net Framework: The Next Battleground?", Virus Bulletin Conference, Sep. 2001, pp. 173-196.

Heins, et al., "Taking Your Information Into the Wireless World: Developing Information for Delivery to Mobile Devices", IEEE, pp. 237-244, Oct. 2001.

Holmes, John W.; e-Mail response to question regarding GET/POST. HTTP request, extracted from Google 's News Groups, php.general, Nov. 11, 2002.

Hovanes, Michael E.; Deal, John R. Grizz; Rowberg, Alan H.; "Seamless Multiresolution Display of Portable Wavelet-Compressed Images" Journal of Digital Imaging, vol. 12, No. 2 suppl. 1 (May), 1999, pp. 109-111.

Howard, "Web Services with ASP.NET", Feb. 2001, MSDN, pp. 1-9.

"HTML Encyclopaedia - The form tag - The HTML element" http://www.scit.wlv.ac.uk/encyc/form.html; 2 pages date unknown.

Ingham, David B.; "W3Objects: A Distributed Object-Oriented Web Server" Object-Oriented Web Servers and data Modeling Workshop, Sixth International World Wide Web Conference, Apr. 7, 1997, Santa Clara, CA 4 pages.

Kaasinen Eija et al.: "Two approaches to bringing internet services to WAP devices," Computer Networks and ISDN Systems, North Holland Publishing, Amsterdam, NL, vol. 33, No. 1, 2000, pp. 231-246.

Kaffe, "Server Side Java", Jan. 16, 2998.

Office Action dated Sep. 18, 2006 in U.S. Appl. No. 11/165,416.

Office Action dated Jan. 2, 2008 in U.S. Appl. No. 11/120,511.

Office Action dated Nov. 28, 2007 in U.S. Appl. No. 10/840,965.

Office Action dated Jun. 20, 2008 in U.S. Appl. No. 10/840,965.

* cited by examiner

Fig. 1c
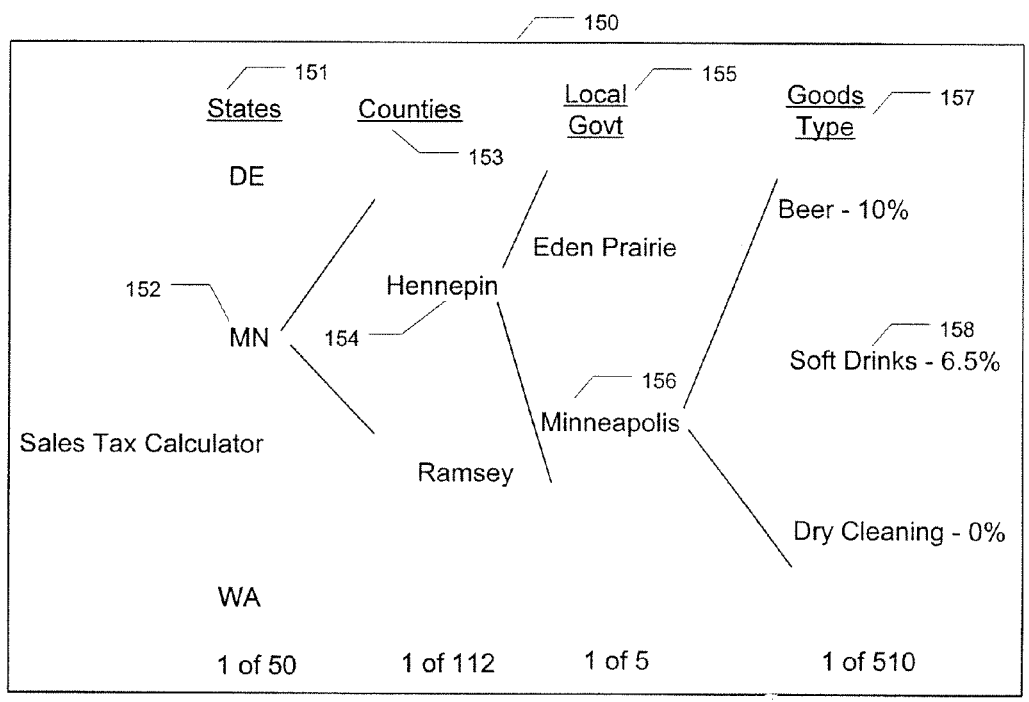
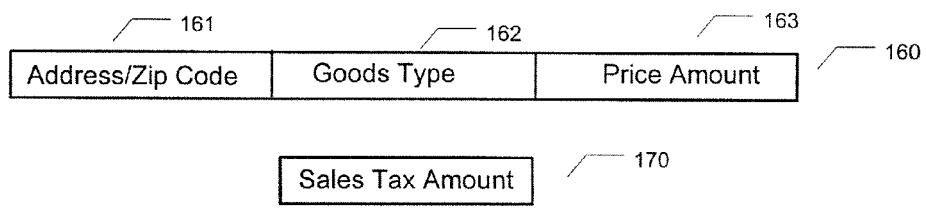

FIG. 6
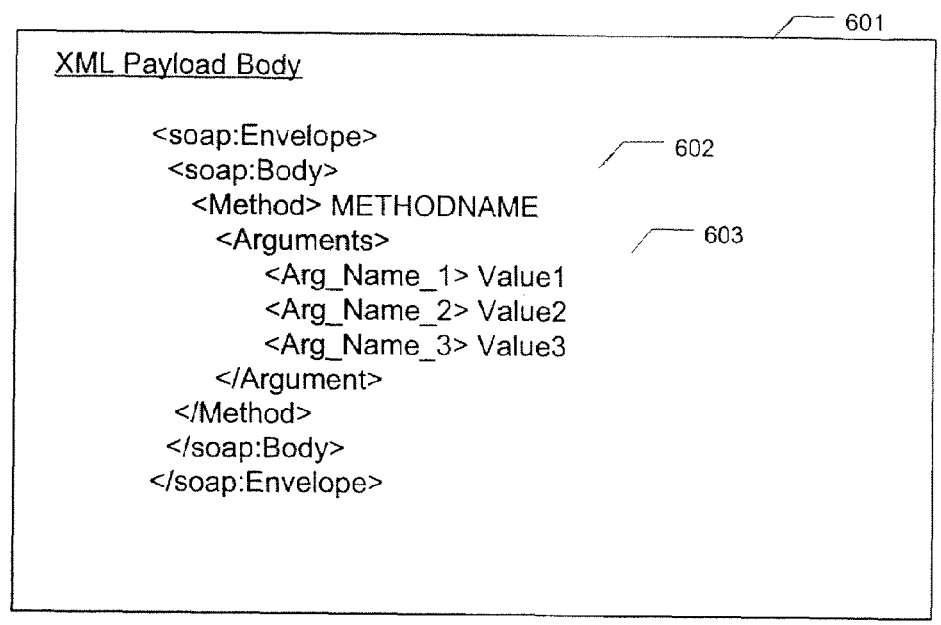
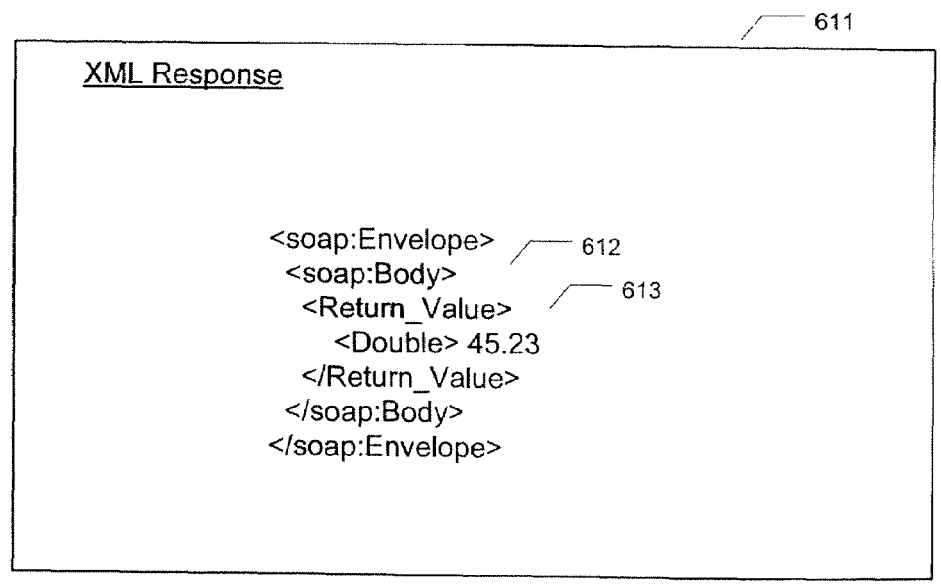

PROVIDING REMOTE PROCESSING SERVICES OVER A DISTRIBUTED COMMUNICATIONS NETWORK

TECHNICAL FIELD

This application relates in general to a method, apparatus, and article of manufacture for providing a set of computing services to remotely executing client processes that execute upon a server connected to the client process over a distributed communications network, and more particularly to a method, apparatus, and article of manufacture for providing web-based processing services to remote users communicating with a server over the Internet.

BACKGROUND

The growth of the Internet and related network communication networks has given rise to an increasingly large numbers of distributed information processing systems in which individual users obtain information from an ever increasing number of sources. Currently, web servers typically provide a mechanism to permit content data to be displayed within a web browser running on a remote client. Over time, this content data has evolved to include static pages, dynamically created pages, and pages that include programmable functionality that executes on the server to generate content displayed to a user within the framework of the browser. This data exchange model typically uses a web browser that transfers a "page" of data that is to be displayed to the user in some manner.

Web servers, however, have not provided remote execution of processing functions that may reside on a server. All of the processing functions that are typically performed by a web server relate to processing database queries and similar data retrieval operations upon data that is resident on the server. Web servers do not typically receive a block of input data, process a function upon the data, and return a resultant set of data. In addition, web servers do not typically operate upon input data sets to generate output data sets as if the web server was responding to a remote process or function call. In spite of the fact that significant computational capacity is resident within web servers, these servers typically provide a "read-only" type of data retrieval function that are based upon user-generated requests.

If web servers provide an interface that allows remote client processes to execute functions resident on the servers using the web as a communications mechanism, web servers provide the equivalent functionality of a remote procedure call for users seeking access to processing functions resident on the server. Such an interface would change the Internet from a means to share and display content data to a distributed processing environment in which web servers provided processing services to remote clients.

SUMMARY

A method, apparatus and article of manufacture for creating Internet web servers that provide processing services, in addition to data and visual content, to remote clients with access to servers. The client processes communicate with these service providing servers over a distributed network like the Internet using standard HTTP communications protocol and similar data exchange languages. Client processes send an HTTP request to a remote server for processing. This processing request may contain input data that is to be used in responding to the request. The server processes the request using the input data, and possibly other data obtained from remote databases, and returns a resultant specified data packet. This processing request, may be initiated using a web browser from an HTML based web page or using a smart client process that simply sends a processing request along with input data and consumes the resultant data packet. The server provides these web services accessed by the client process by allowing the client to access a URL referencing a source code file containing class specifications that may be dynamically compiled into an executable object whenever an executable object corresponding to the current version of the source code referenced by a URL does not exist on the server.

One aspect of the present invention is a method and an article of manufacture containing data readable by a computing system and encoding instructions for providing remote computing services executed upon a server having mass data storage and network communications to remote clients. The method stores source code file within the mass storage of the server, receives a processing service request from a remote client corresponding to a requested processing service specified within the source code file, activates a data processing object corresponding to the processing service requested from the remote client to generate a data response corresponding to the processing service request, formats the data response into a text based data response packet, and transmits the text passed data response packet to the remote client in response to the processing service request. The data processing object corresponds to a compiled data processing class for the requested processing service contained within the source code file.

Another aspect of the present invention is a network server for providing remote computing services executed upon the network server having mass data storage for storing a source code file containing a data processing class corresponding to a data processing object that implements a requested remote processing service. The network server has a network interface I/O module for receiving a processing service request from a remote client corresponding to a requested processing service specified within a source code file and for transmitting the text based data response packet to the remote client in response to the processing service request, a request processing module for generating a data response corresponding to the processing service request, and the request processing module activates the data processing object corresponding to the requested processing service and formatting the data response into a text based data response packet. The data processing object corresponds to a compiled data processing class for the requested processing service contained within the source code file.

Yet another aspect of the present invention is a method and an article of manufacture containing data readable by a computing system and encoding instructions for automatically compiling server executed source code corresponding to data processing objects used to provide remote processing services upon receipt of a request for a remote processing services. The method stores a source code file within the mass storage of the server, receives a processing service request from a remote client corresponding to a requested processing service specified within the source code file, extracts from a packet payload body data block an ID corresponding to the requested processing service, determines whether the data processing object corresponding to the requested processing service is located within a web services library, and determines whether any data processing object found within the web services library correspond to the data processing object generated by compiling the data processing class for the requested processing service contained within the source code file. If the data processing object does not corresponds to the data processing object generated by compiling the data processing class for the requested processing service contained within the source code file, the method automatically compiles the source code file to generate the data processing object for the requested processing service.

Yet another aspect of the present invention is a method and an article of manufacture containing data readable by a computing system and encoding instructions for automatically creating data exchange schema data on a network server corresponding to remote processing services provided by the network server for source code corresponding to data processing objects used to provide the remote processing services upon receipt of a request from a client process. The method storing a source code file within the mass storage of the server, compiling the source code file to generate a data processing object, and automatically generating the data exchange schema data for the data processing object generated when the source code file is compiled to generate the data processing object that provides the requested processing service.

These and various other features as well as advantages, which characterize the present invention, will be apparent from a reading of the following detailed description and a review of the associated drawings.

BRIEF DESCRIPTION OF THE DRAWINGS

Referring now to the drawings in which like reference numbers represent corresponding parts throughout:

FIG. 1c illustrates a sales tax calculating application using a network based processing system providing processing services to remote clients according to one embodiment of the present invention.

FIG. 6 illustrates an XML Request Packet Payload Body and corresponding XML Response Packet according to another embodiment of the present invention.

DETAILED DESCRIPTION

This application relates in general to a method, apparatus, and article of manufacture for providing a network based processing system providing processing services to remote clients.

Figure 1A:
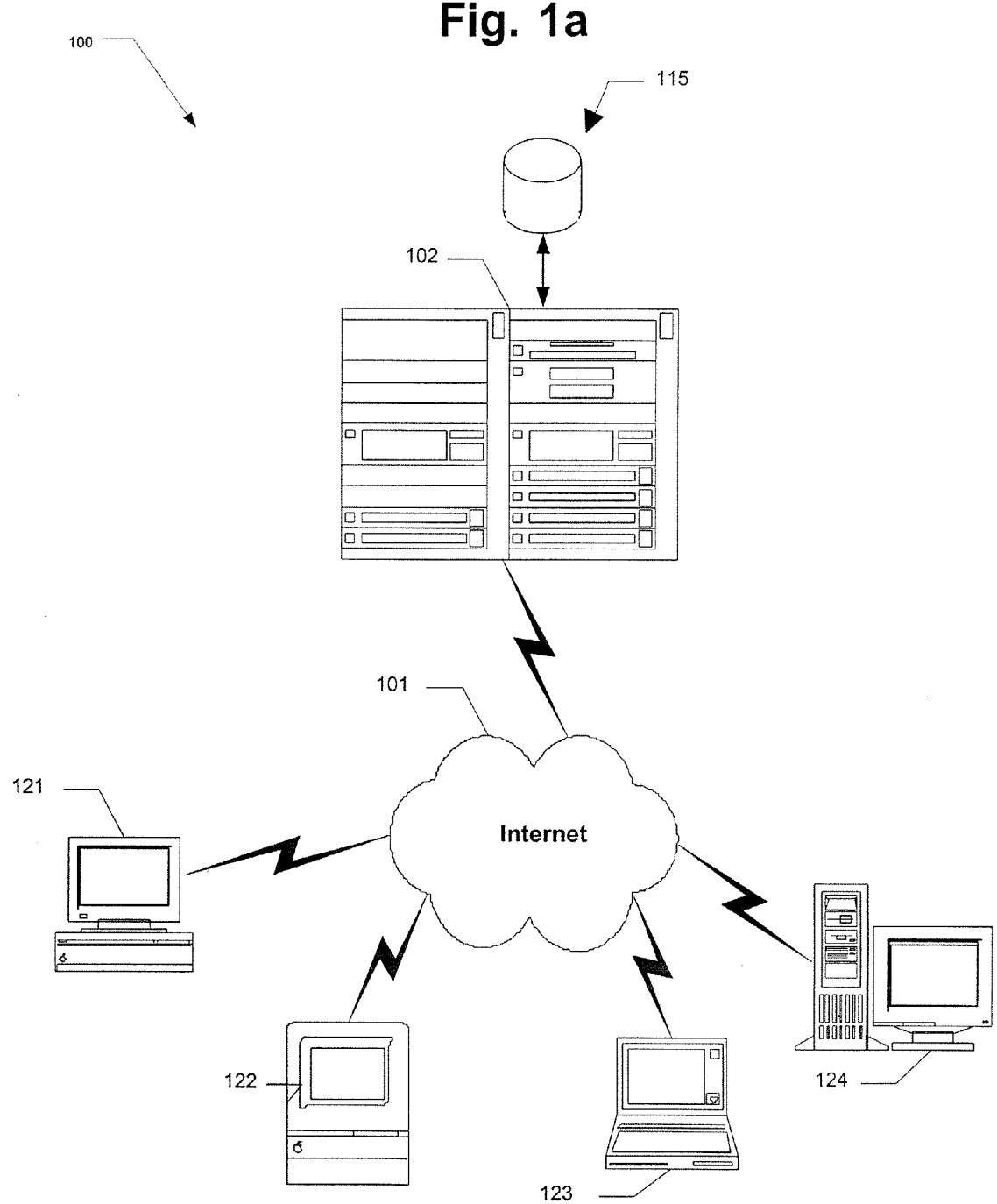
FIG. 1a illustrates a network based processing system providing processing services to remote clients according to one embodiment of the present invention.

FIG. 1a illustrates a network based processing system providing processing services to remote clients according to one embodiment of the present invention. Remote users use client processors 121-124 to communicate over a communications network like the Internet 101 to communicate to one or more server processors 102 to obtain data and processing services. Web servers typically have provided a mechanism to transmit content data to be displayed within a web browser running on a remote client. Over time, this content data has evolved to include static pages, dynamically created pages, and pages that include programmable functionality that executes within the framework of the browser. Web servers have evolved to utilize and support this functional evolution of web browsers. This data exchange model in which a user interface is projected across the web using a web browser to transfers a "page" of data to be displayed to the user.

Remote servers 102, may provide remote execution of processing functions that may reside on a server according to one embodiment of the present invention. In addition to of processing database queries and similar data retrieval operations upon data that is resident on the server, servers typically receive a block of input data, process a function upon the data, and return a resultant set of data. Web servers 102 provide an interface that allows remote client processes to execute functions resident on the servers using the web as a communications mechanism, these servers can provide the equivalent functionality to a remote procedure call to processing functions resident on the server using currently used Internet communications mechanisms. These server resident functions may provide various computing functions to users of the remote clients as discussed in reference to FIGS. 1b-1c.

Figure 1B:
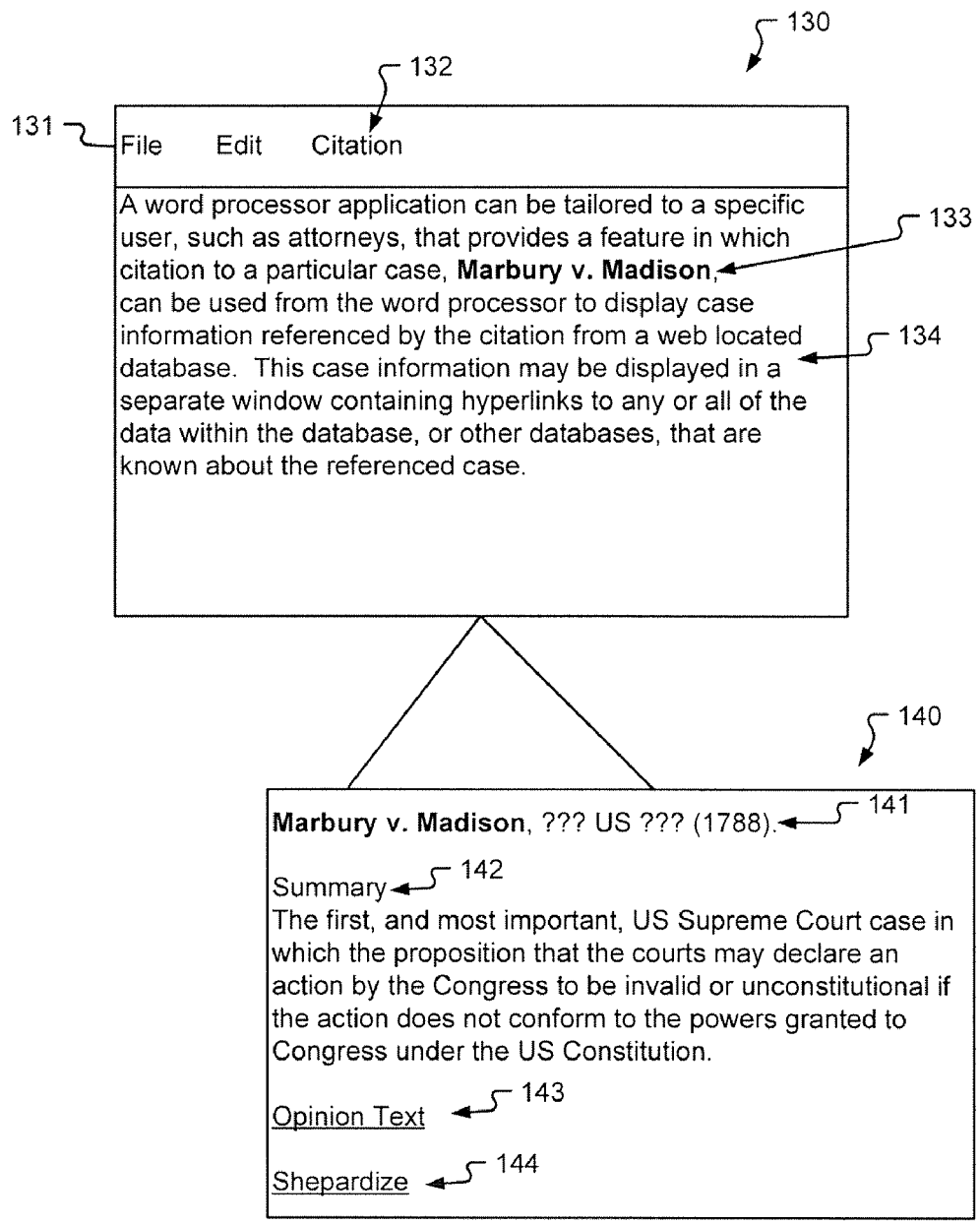
FIG. 1b illustrates a legal word processing application using a network based processing system providing processing services to remote clients according to one embodiment of the present invention.

FIG. 1b illustrates a legal word processing application using a network based processing system providing processing services to remote clients according to one embodiment of the present invention. A word processing application displays a typical data window 130 to a user on a client processor 121. The word processing window 130 contains a menu bar 131 having a plurality of pull-down menus, including a "Citations" 132 menu that is related to legal case citations. A user enters the text for a document 134 into the application 130 as one uses any word processor. When a citation to a court decision 133 is encountered, the word processor can display relevant information about the decision if this data is available in a separate window 140.

Currently, word processors do not provide such a feature because the required data related to these decisions, or any other relevant data, is typically so voluminous that it is not typically present upon the client processor. The web services of the present invention provides a mechanism to provide this data from a web based remote processor for easy importation into the word processing application. Databases containing this case decision data are currently present on the Internet.

What is needed is a processing mechanism to connect the client applications, such as word processing applications with these remotely located databases.

Using web services of the present invention, the word processor would be told, or recognize the citation 134 as such a data item and search the Internet for a data source for the relevant data. The word processor could possess preferences stating where the application should search for the data and the relevant format for the information to be displayed. When the user activated a link associated with the citation, the case data window 140 would be displayed. The case data window 140 may contain a full citation to the case 141, a brief summary of the case 142, and one or more links to other data such as a full text version of the opinion 143 and a listing of decisions citing this decision such as the listing provided to lawyers by Shepard's Citations 144. Any relevant data that can be retrieved from a remote database could be retrieved and displayed using this process. This mechanism would permit this data to be available to users without having an entire copy of the relevant database to be resident on the client computer 121. The word processor 130 can also be configured to store some or all of this relevant data within the document for presentation upon a client processor 121 that is not always connected to the Internet or may merely store links to the data for retrieval when requested by a user. These options may easily be configurable by a user using preference settings within the word processor.

FIG. 1c illustrates a sales tax calculating application using a network based processing system providing processing services to remote clients according to one embodiment of the present invention. Rather than providing a richer data content environment to users as discussed above, the web services may also be used to provide a processing function that uses a remote database that a user does not wish to possess or maintain. One such example processing function is a sales tax calculator. The applicable amount of sales tax to be applied to a given sale varies greatly depending upon the jurisdiction to whom the tax is to be paid.

For example, 50 U.S. states each possess a different state sales tax amount that varies from state to state. Delaware does not collect a sales tax where Minnesota does. Within a given state, such a Minnesota 152, an individual county within Minnesota also may apply a county wide sales tax. Within one county, such as Hennepin County 154, various local cities and towns, such as Minneapolis 156, may also apply local sales tax. For all of these tax rates, the applicable rate may be different depending upon the goods and services 158 being sold.

Merchants that sell goods and services to multiple jurisdictions find the calculation of the correct rate difficult as the number of relevant jurisdictions increases. Rather than have the merchants be responsible for determining the correct rate by address/location and type of goods, a web service can accept a buyer's address, information regarding the type of goods purchased, and a purchase amount for the goods and then calculate and return a tax amount. This web service would maintain a single database of the applicable rates and update the rates as individual state, county, and local jurisdictions modify the applicable tax rate. The merchant would simply access the web service, providing a request that provides an address or zip code 161, a goods type description, 162, and a price 163 in a single request 160. The web service uses the request data 160 to look up the applicable tax rate based upon the address and type of goods and applies the rate to the price to determine a tax amount. This tax amount is returned to the merchant in a return data record 170.

Any processing can be implemented using the above processing models. The complexity of the processing performed by the web service could be limitless, depending upon the processing power of the servers, the data to be processed, and the amount of time a client will reasonably wait for a response. Similarly, any database that provides data to a processing system, and any number of different databases, can be used in such a system. The server and client simply need to express the request data format, the response data format, and the processing to be performed in a same manner.

Figure 2:
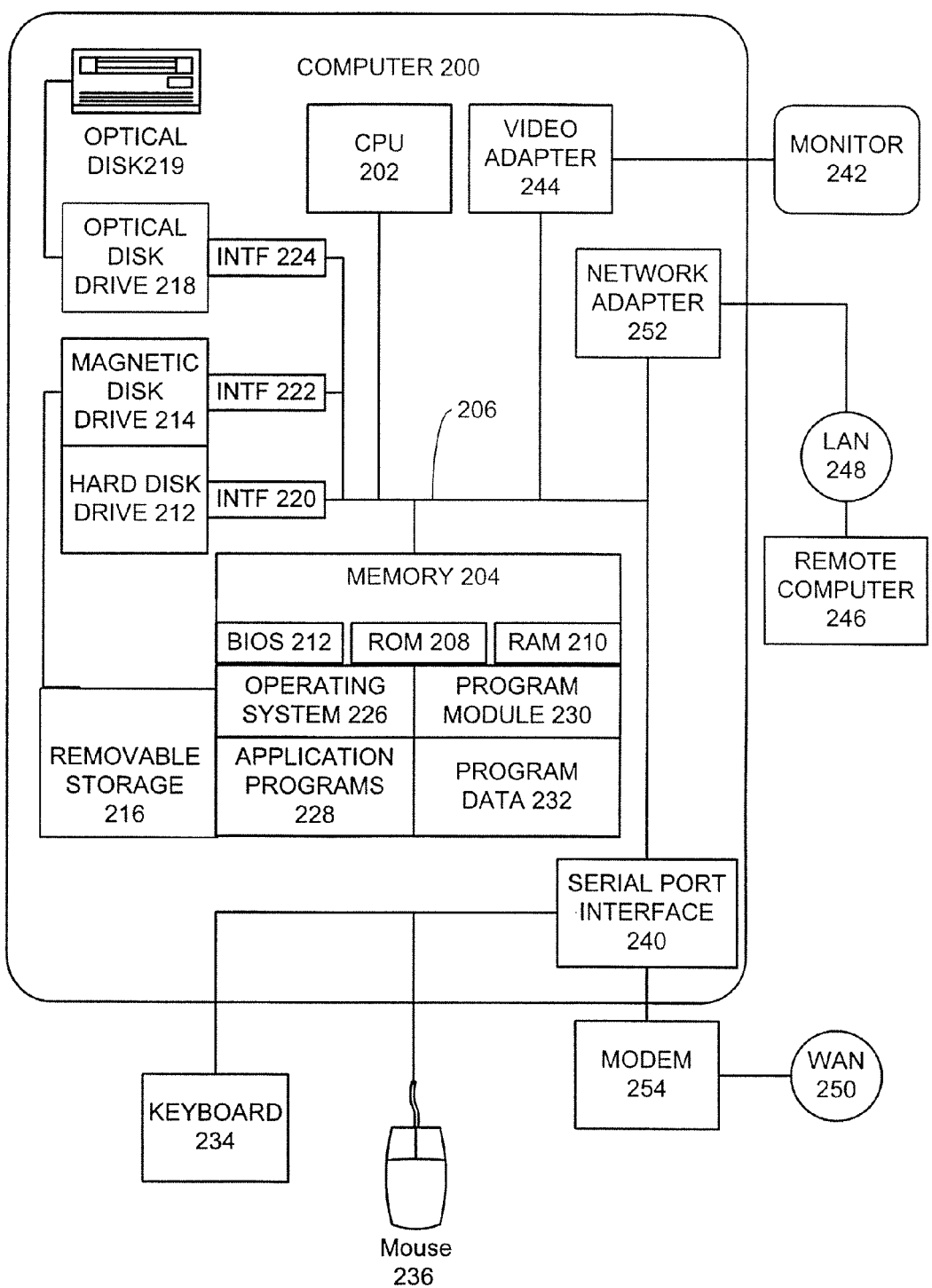
FIG. 2 illustrates a general purpose computing system for use in implementing as one or more computing embodiments of the present invention.

With reference to FIG. 2, an exemplary system for implementing the each of the computing systems, including both web servers and remote clients, include a general-purpose computing device in the form of a conventional personal computer 200, including a processor unit 202, a system memory 204, and a system bus 206 that couples various system components including the system memory 204 to the processor unit 200. The system bus 206 may be any of several types of bus structures including a memory bus or memory controller, a peripheral bus and a local bus using any of a variety of bus architectures. The system memory includes read only memory (ROM) 208 and random access memory (RAM) 210. A basic input/output system 212 (BIOS), which contains basic routines that help transfer information between elements within the personal computer 200, is stored in ROM 208.

The personal computer 200 further includes a hard disk drive 212 for reading from and writing to a hard disk, a magnetic disk drive 214 for reading from or writing to a removable magnetic disk 216, and an optical disk drive 218 for reading from or writing to a removable optical disk 219 such as a CD ROM, DVD, or other optical media. The hard disk drive 212, magnetic disk drive 214, and optical disk drive 218 are connected to the system bus 206 by a hard disk drive interface 220, a magnetic disk drive interface 222, and an optical drive interface 224, respectively. The drives and their associated computer-readable media provide nonvolatile storage of computer readable instructions, data structures, programs, and other data for the personal computer 200.

Although the exemplary environment described herein employs a hard disk, a removable magnetic disk 216, and a removable optical disk 219, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 216, optical disk 219, ROM 208 or RAM 210, including an operating system 226, one or more application programs 228, other program modules 230, and program data 232. A user may enter commands and information into the personal computer 200 through input devices such as a keyboard 234 and mouse 236 or other pointing device. Examples of other input devices may include a microphone, joystick, game pad, satellite dish, and scanner. These and other input devices are often connected to the processing unit 202 through a serial port interface 240 that is coupled to the system bus 206. Nevertheless, these input devices also may be connected by other interfaces, such as a parallel port, game port, or a universal serial bus (USB). A monitor 242 or other type of display device is also connected to the system bus 206 via an interface, such as a video adapter 244. In addition to the monitor 242, personal computers typically include other peripheral output devices (not shown), such as speakers and printers.

The personal computer 200 operates in a networked environment using logical connections to one or more remote computers, such as a web server 246. The remote computer 246 may be another personal computer, a server, a router, a network PC, a peer device or other common network node, and typically includes many or all of the elements described above relative to the personal computer 200. The network connections include a local area network (LAN) 248 and a wide area network (WAN) 250. Such networking environments are commonplace in offices, enterprise-wide computer networks, intranets, and the Internet.

When used in a LAN networking environment, the personal computer 200 is connected to the local network 248 through a network interface or adapter 252. When used in a WAN networking environment, the personal computer 200 typically includes a modem 254 or other means for establishing communications over the wide area network 250, such as the Internet. The modem 254, which may be internal or external, is connected to the system bus 206 via the serial port interface 240. In a networked environment, program modules depicted relative to the personal computer 200, or portions thereof, may be stored in the remote memory storage device. It will be appreciated that the network connections shown are exemplary, and other means of establishing a communications link between the computers may be used.

Additionally, the embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Figure 3:
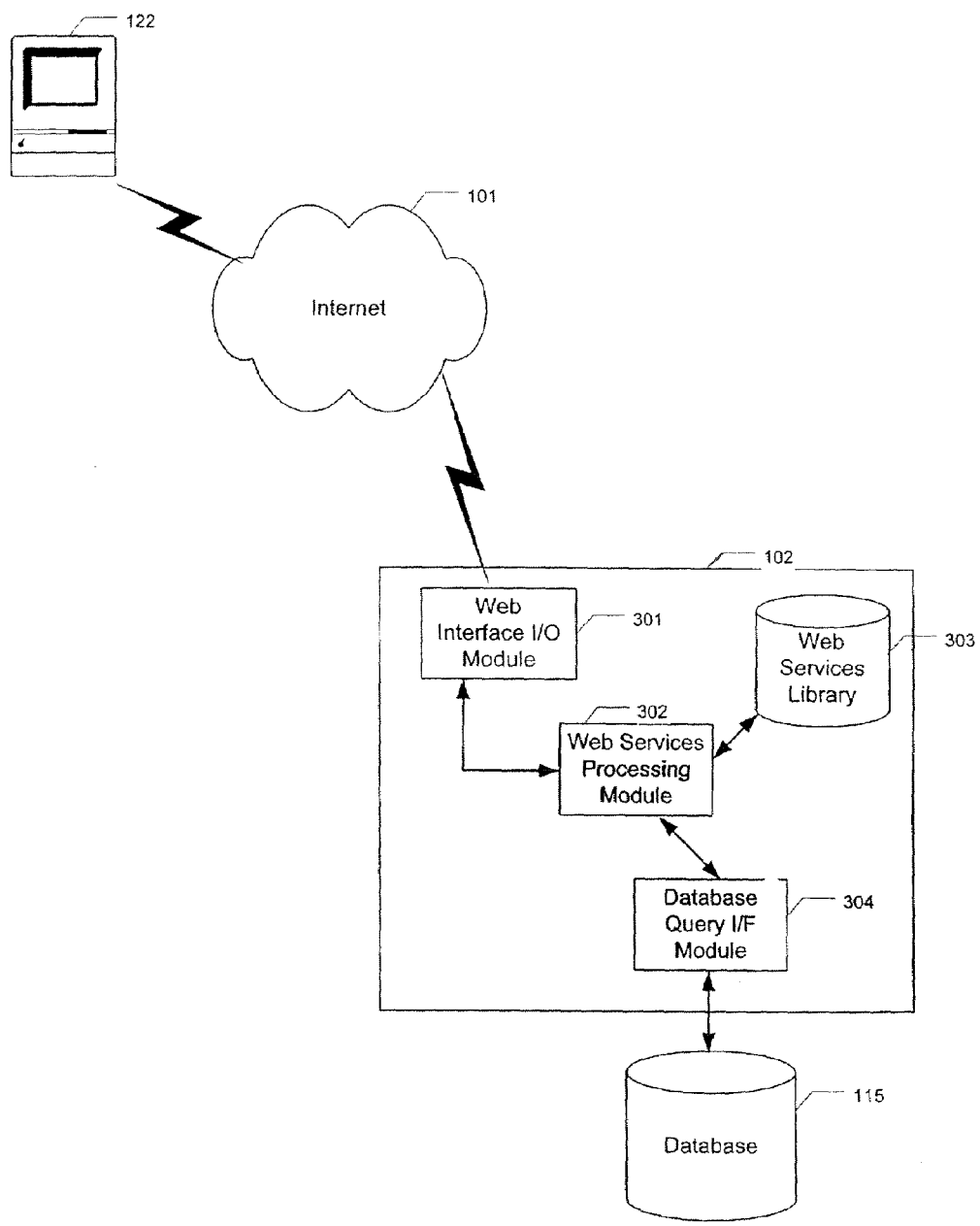
FIG. 3 illustrates an Internet based processing system providing processing services to remote users according to another embodiment of the present invention.

FIG. 3 illustrates an Internet based processing system providing processing services to remote users according to another embodiment of the present invention. A remote client 122 communicates to a server 102 over a communications network 101 to transmit a web service request and receive a corresponding response. In one embodiment, this communication is performed using the well known HTTP communications protocol; although, any request/response communications protocol could be used without deviating from the spirit and scope of the present invention as recited in the attached claims.

Within the server 102, a web server I/O module 301 provides the communication processing necessary to communicate with the remote client 122. The web server I/O module 301 receives the incoming request, extracts the relevant data from the request and passes the request to a Web services processing module 302, and returns the response generated by the web services processing module 302 to the client 122. This module 301 is responsible for conforming the data to the relevant communications protocol.

The web services processing module 302 accepts the requests from the I/O module 301 and generates a response. This processing module 302 uses processing modules contained within a web services library 303 to perform the web services processing request. This processing module 302 also retrieves any data needed to perform the processing request from one or more databases 115 using a database query interface module 304. This interface module 304 performs the communication functions between the server 102 and the database 115. This interface module 304 also performs any data formatting functions necessary to present the needed data to the processing module 302 in a usable format. Alternatively, a web services library may directly access a database and return the results directly to processing module 302. Once the processing module 302 has generated the response corresponding to the requested web service, the response is sent back to the client 122 using the web interface I/O module 301.

Figure 4:
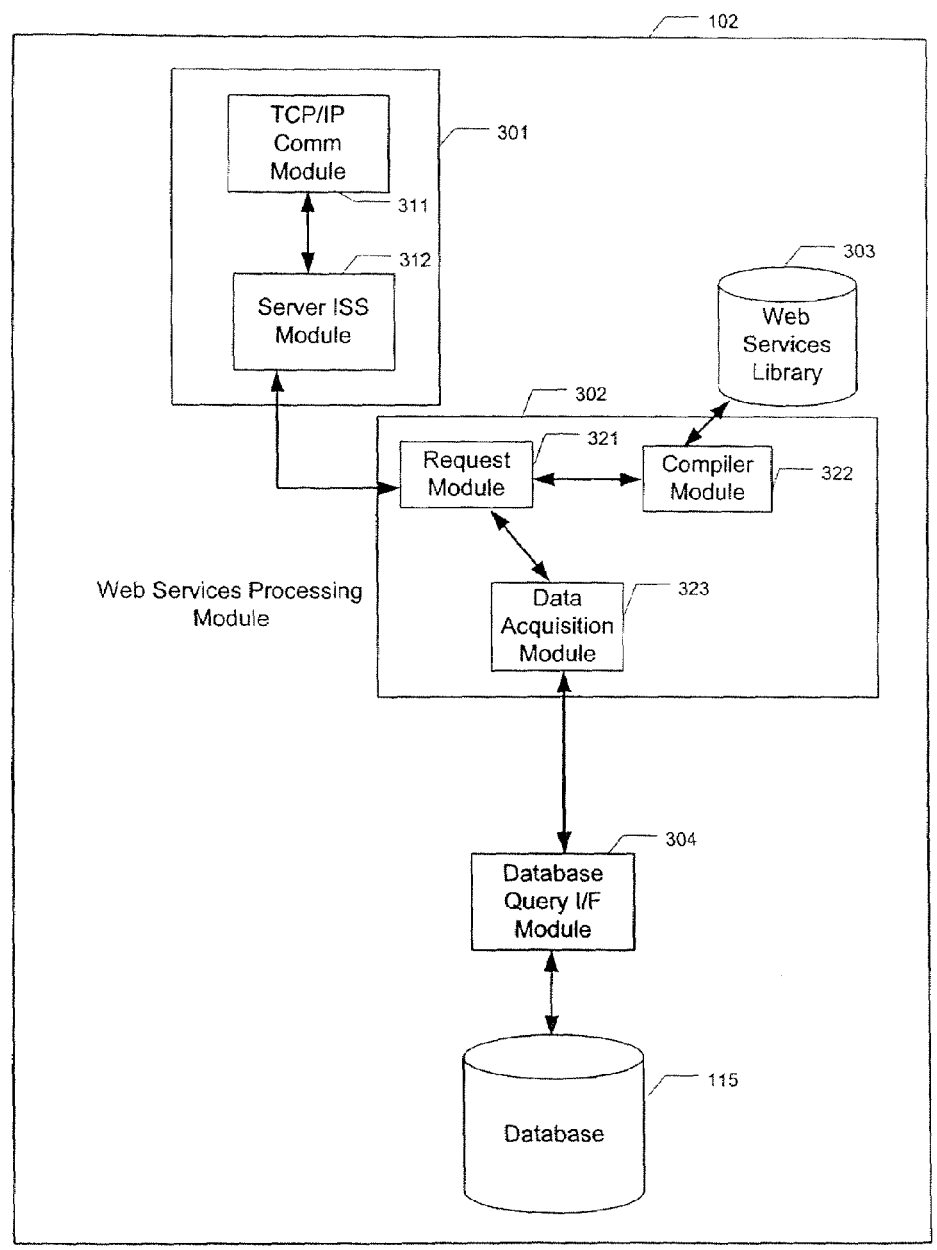
FIG. 4 illustrates a network server providing processing services to remote users according to yet another embodiment of the present invention.

FIG. 4 illustrates a network server providing processing services to remote users according to yet another embodiment of the present invention. The server 102 consists of the web interface I/O module 301 contains a TCP/IP communications module 311 and a server security module 312 to perform its web communications function. The TCP/IP communications module 311 receives TCP/IP communications data packets and determines which packets correspond to web server requests. These web server requests are sent to a Server security module 312 for processing.

The Server security module 312 receives these request packets that typically contain a URL that identifies the provides an indication of the identity of the request, and the data corresponding to the request that is to be processed. If the Server security module 312 determines that the URL corresponds to a web service request, the request is sent to the web services processing module 302 for handling. The Server security module 312 may also receive other types of requests such as Active Server Page (ASP), Common Gateway Interface (CGI) script and other web server requests that are handled by other functions not part of the present invention.

The web services processing module 302 comprises of a request module 321, a compiler module 322, and a data acquisition module 323. The request module 321 receives the incoming web services request and determines whether the requested web service exists on the server 102 and if it is contained within the web services library for use in generating the response to the incoming request. Because the request is provided in the form of a URL, the request typically corresponds to a file that contains instructions providing the processing to be performed. For example, URL, such as http://www.microsoft.com/example/index.html, may provide a reference to a file that contains an HTML specification for a web page. This file may contain human readable source code in any programming language such as HTML, C++, or any other programming language. This file may contain any number of processing modules and exposed web services that may be accessed by a client 122.

The request module 321 determines whether this file has been previously compiled and stored within the web services library 303. If the file has been compiled, and if the compiled version corresponds to the current version of the URL file, the processing object module stored in the library is retrieved for use in servicing the incoming request. If the URL file has not been compiled, or if the URL has been modified since the file was compiled, a compiler module 322 is used to compile the URL file into a executable processing object module. The compiler module 322 compiles the current version of the file referenced by the URL, stores the newly compiled object within the library 303 for later use, and passes the compiled object to the request module 321 for processing.

Once the request module 321 receives the executable processing object module, the request module 321 services the incoming request by executing the executable processing module using any input data provided with the incoming request. If the executable processing module requests data from a database 115 as part of its operation, the request module sends a data request to the data acquisition module 323. This data module 323 obtains the needed data using the database query interface module 304 as discussed above and returns the data to the request module 321 for use by the executable processing object.

Figure 5:
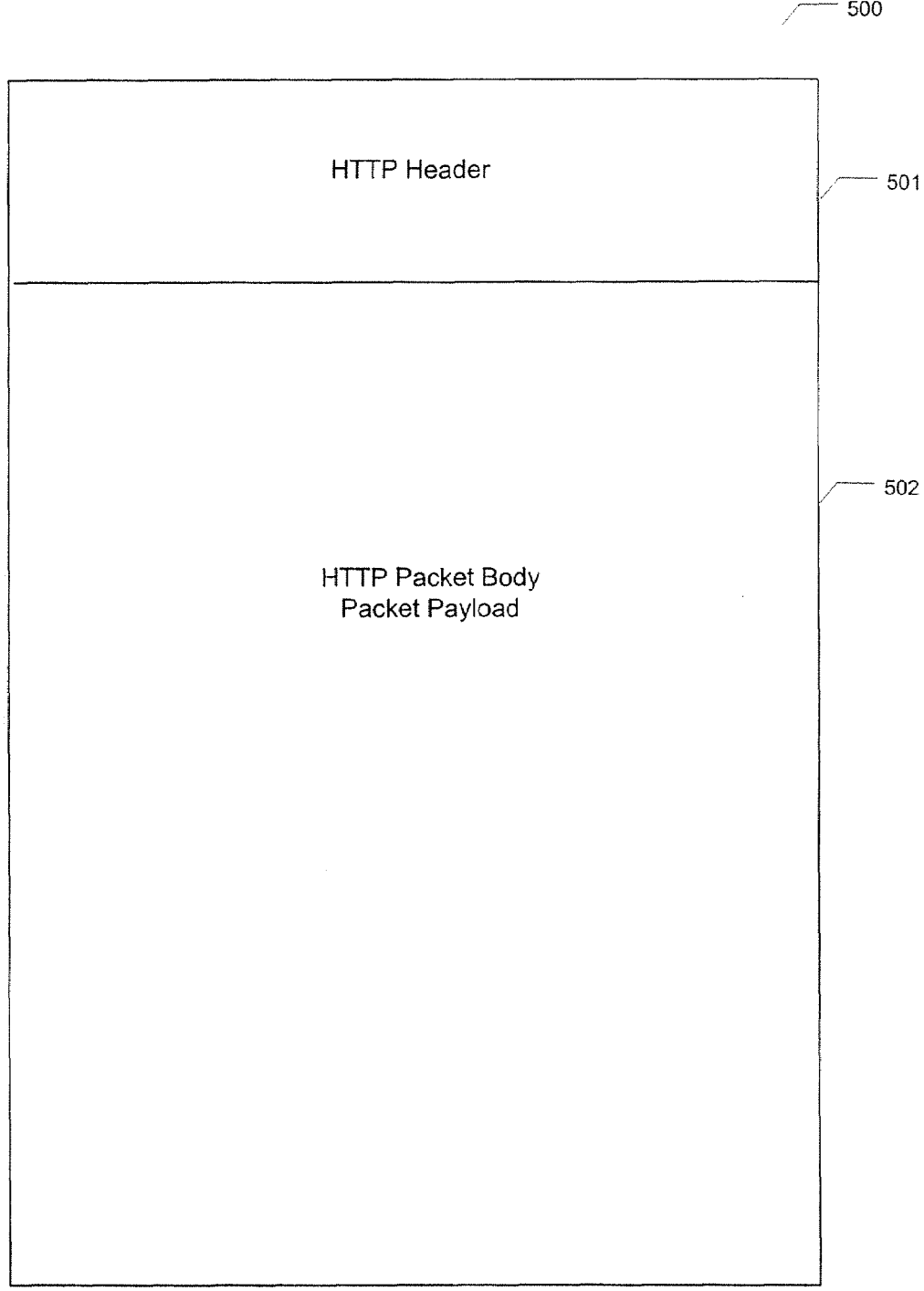
FIG. 5 illustrates an HTTP packet used by a network server providing processing services to remote users according to an embodiment of the present invention.

FIG. 5 illustrates an HTTP packet used by a network server providing processing services to remote users according to an embodiment of the present invention. The HTTP Packet 500 contains a HTTP header 501 to perform the standard HTTP communications function. HTTP header 501 typical contains information relating to the URL of the request, information regarding the identity and type of requesting client, and return address information associated with the client for sending a response to the request.

HTTP Packet 500 also contains Packet Body Payload 502 that contains information to be used in the request. In cases where a web service is requested by the packet, the packet body payload 502 contains a description of the web service request and any data to be processed as part of the web services request. In an exemplary embodiment, this payload contains a textual description of the request and data in an XML format using the XML language, as specified in the Extensible Markup Language (XML) v1.0 specification as defined by the w3c.org standards organization. In particular, the present invention uses SOAP standard specification for XML specification of the data specification protocol. A complete description of the SOAP standard can be found in the Simple Object Access Protocol (SOAP) v.1.1 specification as defined by the w3c.org standards organization. Of course, any particular XML standard, or any similar data exchange specification language including a Web Services Description Language (WSDL), may be used without deviating from the spirit and scope of the present invention as recited in the attached claims.

FIG. 6 illustrates an exemplary XML Request Packet Payload Body and corresponding XML Response Packet according to another embodiment of the present invention. An XML payload body contains a reference to the name of the web service to be performed 602 as well as one or more input data arguments 603 that are to be passed to the web service for processing. The payload also contains the necessary references to identify the specific data specification standard as well as any other labels needed to conform the input data to the specific data specification standard. Of course, one skilled in the art will recognize that this particular embodiment of the present invention that utilizes the XML, SOAP, and WSDL standards may possess alternate embodiments that utilize a data payload body 601 to transmit data between a web server and a remote client without deviating from the spirit and scope of the present invention as recited in the attached claims. The XML response 611 generated by the incoming web service request contained in the XML payload body 601 also contains data to be returned 612 and its values 613 as well as the necessary references to identify the specific data specification standard as well as any other labels needed to conform the input data to the specific data specification standard.

Figure 7:
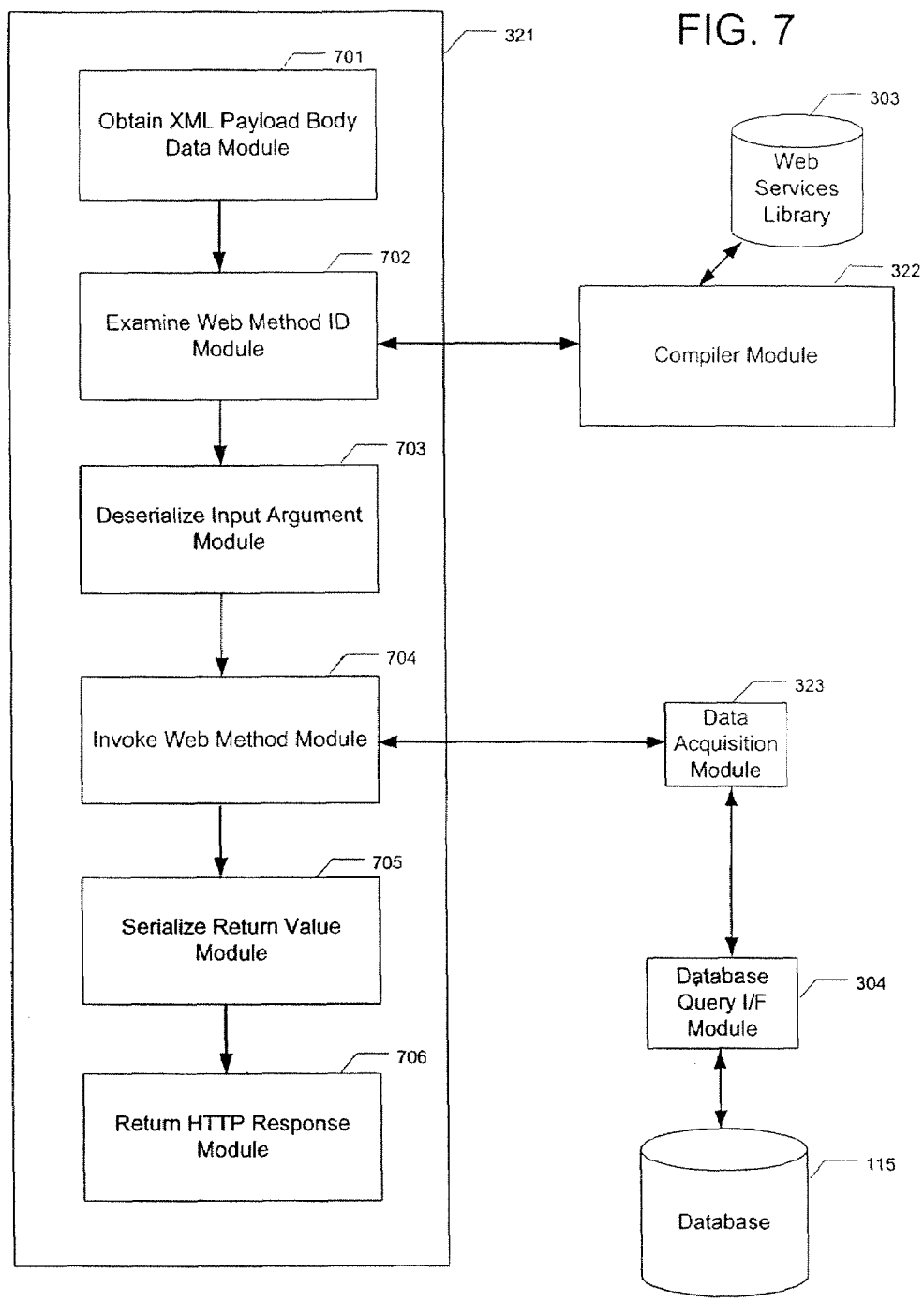
FIG. 7 illustrates a network server providing processing services to remote users according to yet another embodiment of the present invention.

FIG. 7 illustrates a network server providing processing services to remote users according to yet another embodiment of the present invention. The request module 321 contains a series of processing modules that process a web service request contained in a HTTP packet payload body. The packet payload body is first read by an Obtain XML payload body module 701. The module 701 extracts the relevant payload body data from the incoming packet for use in the processing. An Examine Web Method ID module 702 examines the XML data from the payload data to determine the identity of the web services method to be performed. The examine module 702 determines if the method can be found. The examine module 702 will also determine if a compiled version of a processing object exists within the web services library 303. If the examine module 702 finds the processing object, it is requested from the compiler module 322. If the stored version of the processing object does not correspond to the current version of the object, the compiler module 322 will compile the object before returning the object to be used to service the request.

Once an executable object is obtained, a deserialize input argument module 703 reads and marshals the input arguments 603 from the payload body 502 into data that can be passed to the executable object obtained from the compiler module 322. The input arguments and the executable object are passed to an invoke web method module 704 to execute the object using the input data to generate a response to the web services request. If data from a database 115 is needed by the executable object, the data request is sent to a data acquisition module 323 for servicing through an interface module 304.

The executable object completes its processing and generates response data that is to be returned to the requesting client 122. The response data is converted into XML textual data in the appropriate format in a Serialize Return Value module 705. This module 705 accepts data from the executable object and converts the data into a textual based data stream that is sent back to the client 122 as part of the HTTP response to the incoming request using the Return HTTP Response Module 706.

Figure 8:
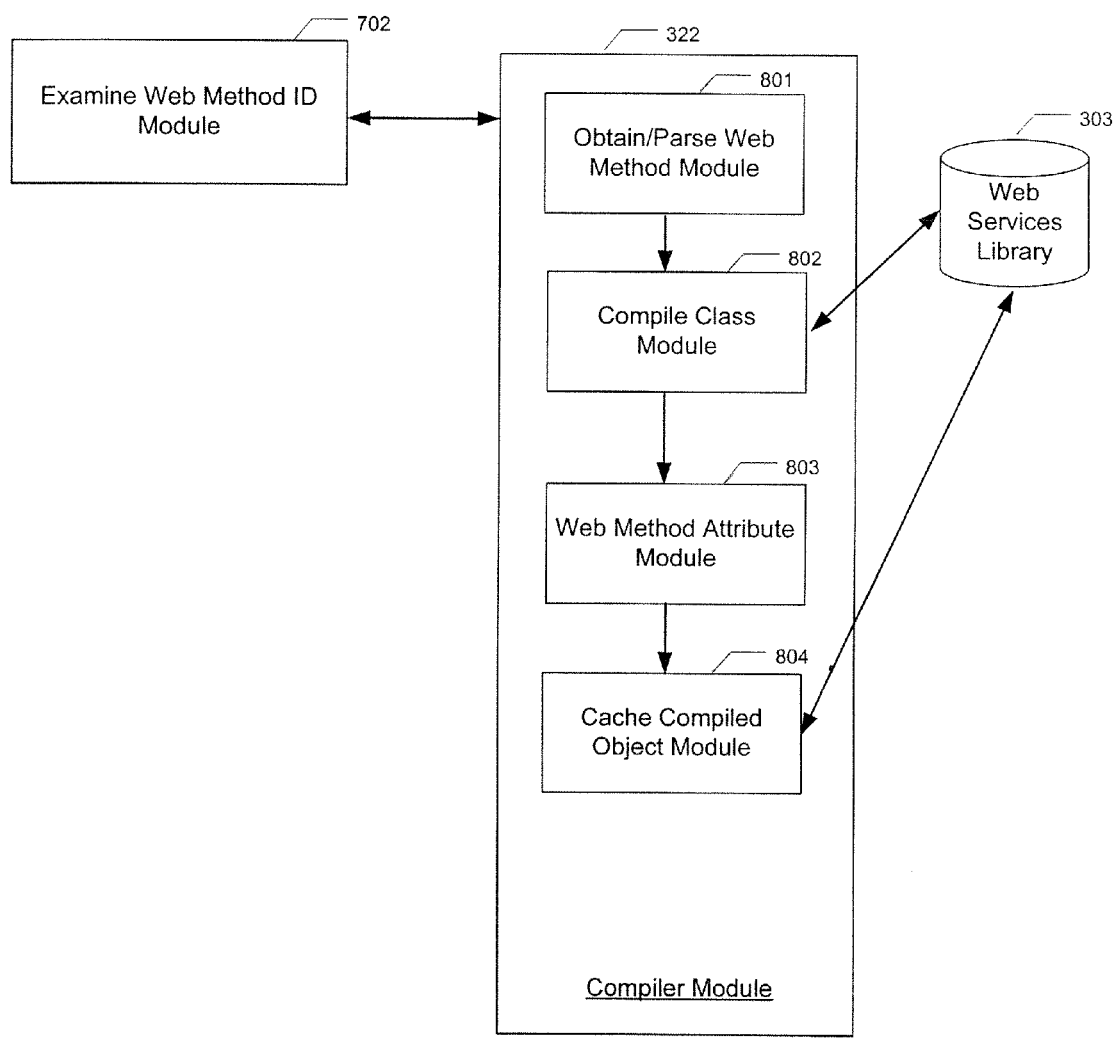
FIG. 8 illustrates a compiler module within a network server providing processing services to remote us according to an embodiment of the present invention.

FIG. 8 illustrates a compiler module within a network server providing processing services to remote us according to an embodiment of the present invention. As discussed above in FIG. 7, the Examine Web Method ID module 702 uses the incoming URL to identify the web services method corresponding to the incoming request. As also stated above, the URL references a text file containing source code for the module or modules needed to provide the web service. These modules may consist of any number of processing modules in any programming language. The modules that are exposed as accessible by client processors 122 are identified as publicly available methods. The file may also contain other modules, if needed, that are only accessible within other modules. With such an architecture, a web service may be constructed using any number of libraries of executable modules containing a set of entry points accessible by clients without exposing all of the modules within these libraries if that is desired.

The examine module 702 checks the URL referenced file to determine if the requested web service method is contained in the referenced file. If the method is present, the examine module sends a request to the compiler module 322 to obtain the executable object. Within the compiler module 322, a obtain/parse web method module 801 receives the packet payload body data and determines if a compiled version of the web service executable object is stored in the web services library 303. If an executable object is found, the module also checks to see if the stored version corresponds to the current version of the URL file. If the stored object does match the URL referenced file, the object is simply obtained from the library 303 and returned to the examine module 702.

If the obtain/parse module 801 determines that the library 303 does not contain a usable executable object, the URL file needs to be compiled into an executable object. This compilation operation will only occur the first time the URL referenced file is accessed following is storage onto the server 102. All other requests will use the library version until the file is modified.

If the URL referenced file needs to be compiled, the URL source code file is read and compiled by a compiler corresponding to the programming language specified to be used in the source file by the compile class module 802. This compiler module 802 will compile all objects in the source code file. These objects may use any other executable objects present on the server. As such, these objects may reference other objects contained in the source code file as well as objects present in other source code filed stored on the server that can be accessed using a URL reference to a source code file. The same process is followed when the these external objects are referenced to determine if the objects exist within the source code files referenced by the URL and to determine whether the library 303 contains usable executable objects that do not require compilation.

Once the compilation has been completed, a web method attribute module 803 identifies all publicly available attributes to publicly accessible web service methods. These methods and corresponding attributes are the values that may be passed to the server from the client as part of a web service request. A cache compiled object module 804 stores the newly compiled object, along with a description of its publicly accessible methods/attributes into the web services library 303 for use in subsequent requests for this service before the executable object is returned to the request module 321.

Figure 9:
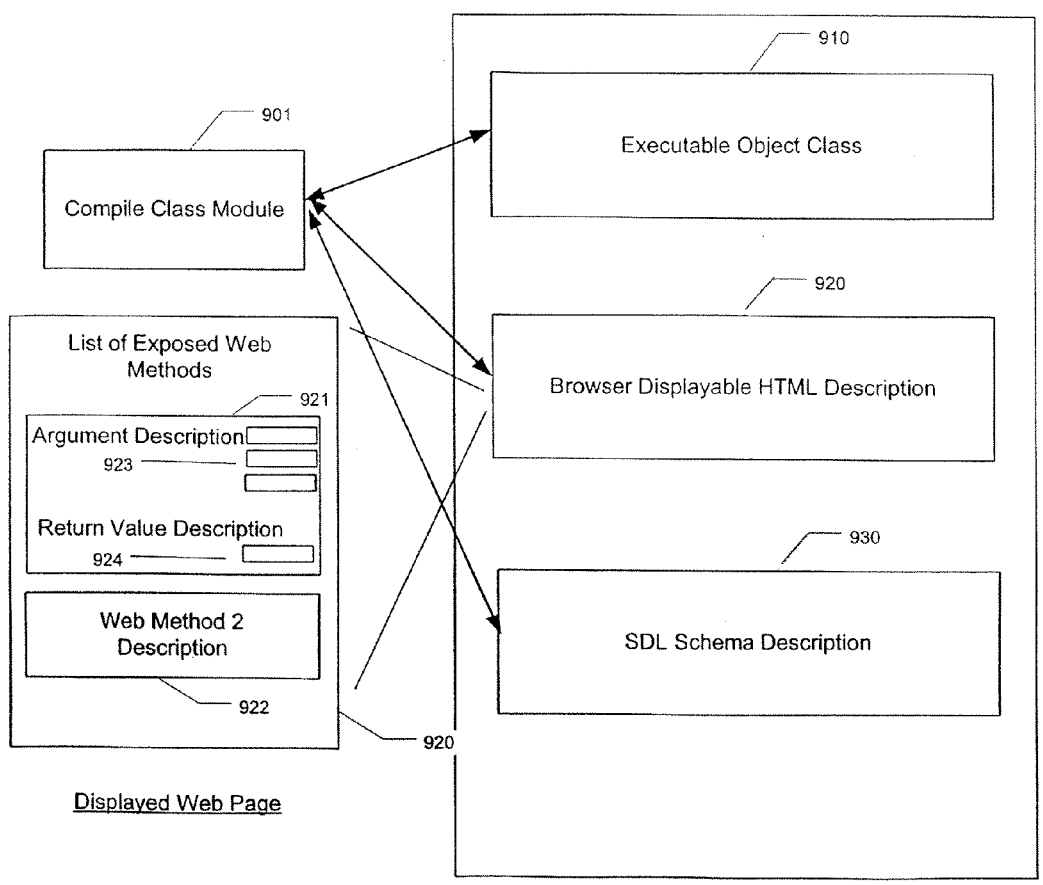
FIG. 9 illustrates a plurality of output data types generated by a compiler module according to an embodiment of the present invention.

FIG. 9 illustrates a plurality of output data types generated by a compiler module according to an embodiment of the present invention. The above discussion of the compiler module presumes that a compiler will generate an executable object from a source code file. This compiler 322, and all of its modules 801-804, may generate other forms of data in addition to executable objects. Specifically, the compiler module 322 generates a compiled class module 901 containing one or more types of data. These types of data include an executable class module 910 as discussed above. In addition, the compiled class module 901 may include a description of the publicly exposed web services contained within the source code file referenced by the URL. This description may include a description of the function or functions performed by each of the publicly exposed web services. As part of these descriptions, a definition for the input arguments, and any publicly accessible attributes, as well as a definition of the output data generated by the web service are provided. This description may be presented in any number of formats.

One such format for the description is an Browser Displayable HTML Description. The compiler will generate an HTML page description 920 that contains a description of the functions performed in the exposed web services. These descriptions are contained within data found in the source code files. In addition, a description of the input and output data arguments 921-922 for the each web service will be provided. This data argument descriptions 921-922 may also present fields 923 permitting a user to enter values for the input arguments using a web browser. The return value description for each web service contains a invoke button 924 that causes the web service to be called using the input argument values contained in the web page fields 923. The web browser will display the returned XML result data from the web service request.

A user and developer may use this HTML description to determine the input and output arguments for a web service as well as test a web service interactively while it is being debugged. The server 102, within its ISS server module 312 can determine if the incoming request is coming from a web browser or from some other client process using HTTP header data to determine if the HTML version is to be returned.

In addition to the HTML description 920, a textual schema description in a data exchange schema specification format may be provided. XML as currently specified by the w3c.org standards organization, provides mechanisms for specifying how schema descriptions for data being exchanged using XML are to be specified. In an exemplary embodiment, this schema description is specified using a WDSL when WDSL is used to specify the XML data within the packet payload body data. Other schema description languages, such as RDF as proposed by the w3c.org standards organization, may also be used without deviating from the spirit and scope of the present invention as recited within the attached claims. Users may obtain these schema descriptions to determine the format and functions of the web services and corresponding input and output arguments.

Figure 10:
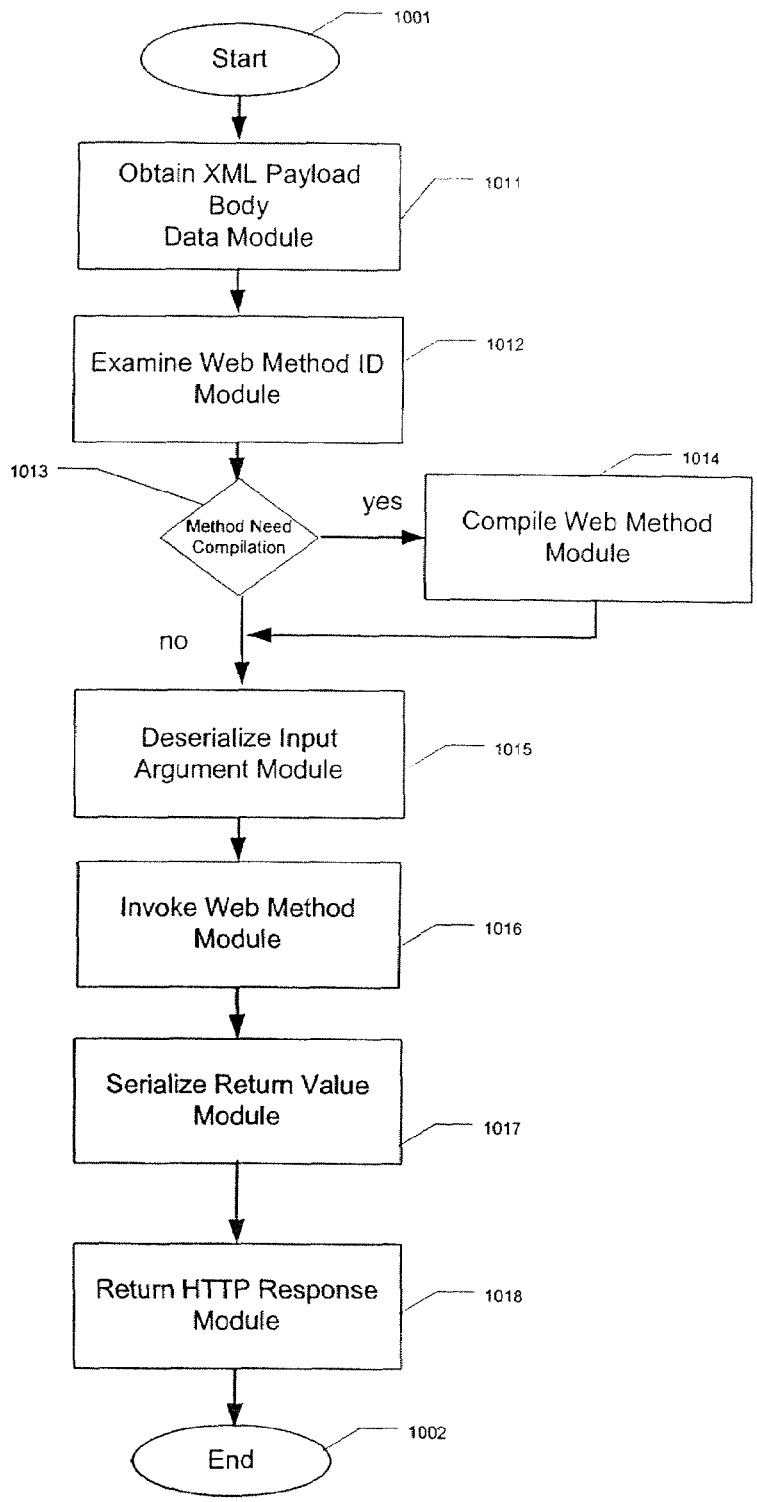
FIG. 10 illustrates an operational flow for the server-based processing system according to an embodiment of the present invention.

FIG. 10 illustrates an operational flow for the server-based processing system according to an embodiment of the present invention. This operational flow corresponds to the server based processing as discussed above in reference to FIG. 7. The operational flow starts 1001 and packet payload body is first read by an Obtain XML payload body module 1011. The obtain data module 1011 extracts the relevant payload body data from the incoming packet for use in the processing. An Examine Web Method ID module 1012 examines the XML data from the payload data to determine the identity of the web services method to be performed. A test module 1013 determines if the method can be found, and if present determines if a compiled version of a processing object exists within the web services library 303. If the test module 1013 finds the processing object needs to be compiled, a compile web method module 1014 compiles the object to generate an executable object to be used to service the request.

Once an executable object is obtained, a deserialize input argument module 1015 reads and marshals the input arguments 603 from the payload body 502 into data that can be passed to the executable object. The input arguments and the executable object are passed to an invoke web method module 1016 to execute the object using the input data to generate a response to the web services request.

The executable object completes its processing and generates response data that is to be returned to the requesting client 122. The response data is converted into XML textual data in the appropriate format in a Serialize Return Value module 1017. This module 1017 accepts data from the executable object and converts the data into a textual based data stream that is sent back to the client 122 as part of the HTTP response to the incoming request using the Return HTTP Response Module 1018 before the processing ends 1002.

Figure 11:
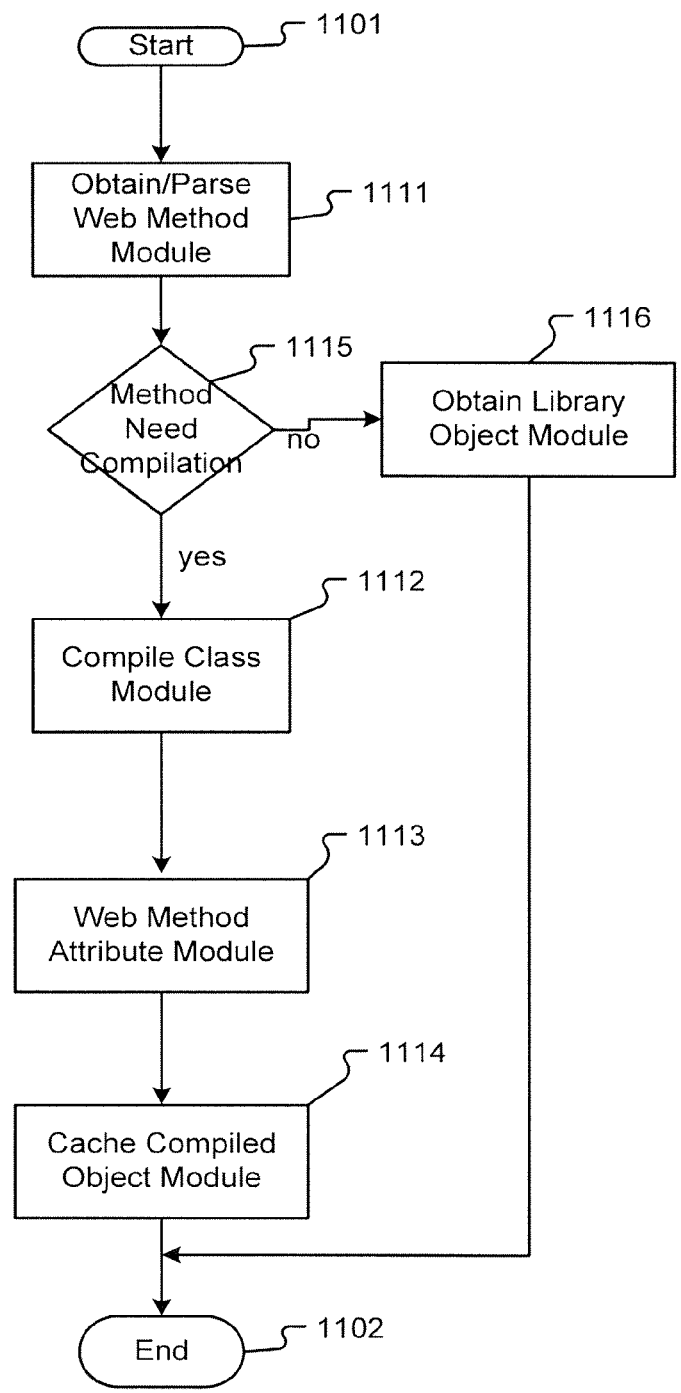
FIG. 11 illustrates an operational flow for a compiler module according to an embodiment of the present invention.

FIG. 11 illustrates an operational flow for a compiler module according to an embodiment of the present invention. The compiler module processing starts 1101 and an obtain/parse web method module 1111 receives the packet payload body data and parses the data to identify the requested web service. Test module 1115 determines if a compiled version of the web service executable object is stored in the web services library 303, and if found, the module 1115 also checks to see if the stored version corresponds to the current version of the URL file. If the stored object does match the URL file, no compilation is needed. The processing proceeds to an obtain library module 1116 where the object is simply obtained from the library 303 and returned before the processing ends 1102.

If the test module 1115 determines that the library 303 does not contain a usable executable object, the URL file needs to be compiled into an executable object. A compile class module 1112 will compile all objects in the source code file. These objects may use any other executable objects present on the server. As such, these objects may reference other objects contained in the source code file as well as objects present in other source code filed stored on the server that can be accessed using a URL reference to a source code file. The same process is followed when the these external objects are referenced to determine if the objects exist within the source code files referenced by the URL and to determine whether the library 303 contains usable executable objects that do not require compilation.

Once the compilation has been completed, a web method attribute module 1113 identifies all publicly available attributes to publicly accessible web service methods. These methods and corresponding attributes are the values that may be passed to the server from the client as part of a web service request. A cache compiled object module 1114 stores the newly compiled object, along with a description of its publicly accessible methods/attributes into the web services library 303 for use in subsequent requests for this service before the processing ends 1102.

Figure 12:
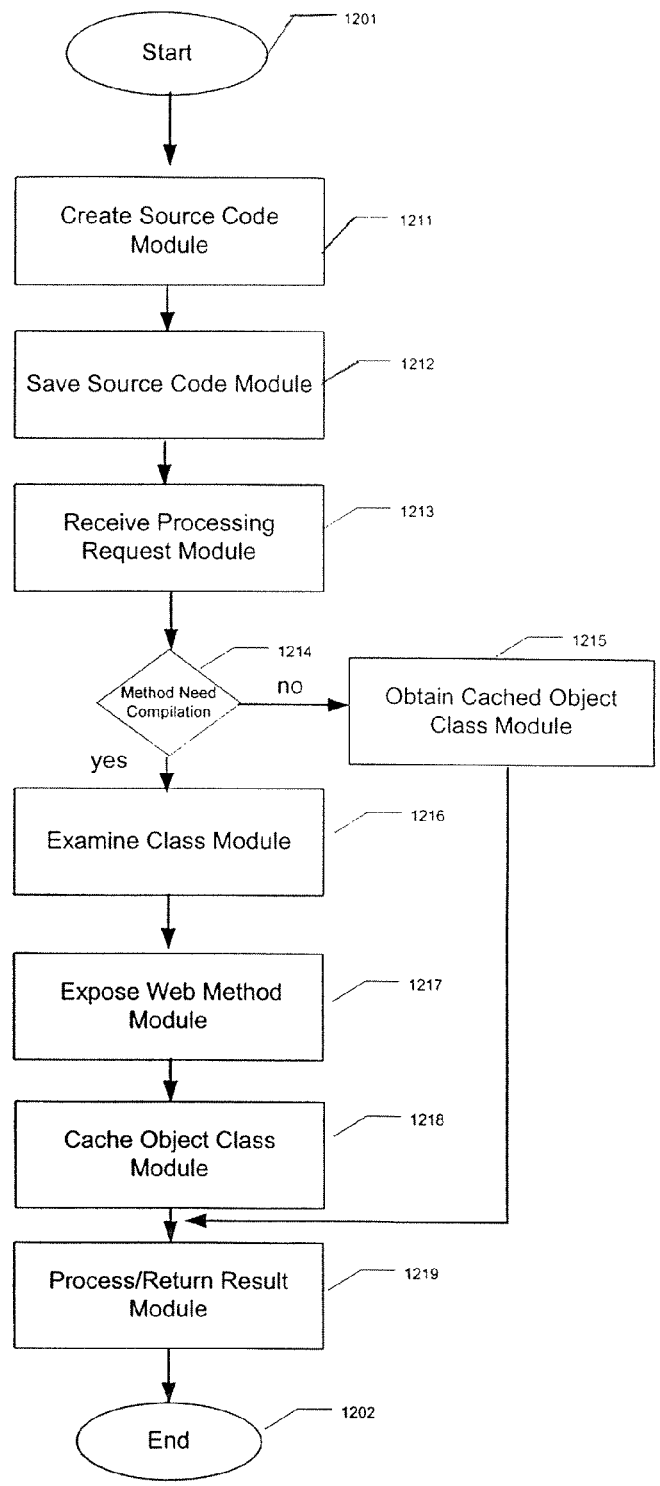
FIG. 12 illustrates an operational flow for a programming method for providing processing services to remote users according to one embodiment of the present invention.

FIG. 12 illustrates an operational flow for a programming method for providing processing services to remote users according to one embodiment of the present invention. The processing begins 1201 and a source code file is created in a desired programming language by a Create source code module 1211. The created source code file is saved onto a server 102 using a save source code module 1212. The storage location of the source code file corresponds to the URL for the web service request for any exposed web service contained within the source code file.

Once the source code file is saved, the processing continues once a web service request is received by a receive processing request module 1213 in the server 102. The receive request module 1213 receives the request for the URL corresponding to the source code file that contains a payload body referencing the exposed web service. A test module 1214 determines if the requested web method needs to be compiled. This test compares any compiled version in the web service library 303 with the source code file to see if the versions correspond to each other. If the test module 1214 determines that no compilation is necessary, an Obtain Cached Object Class module 1215 retrieves the executable object from the library 303. A Process request module 1219 activates the retrieved object and passes any input arguments parsed from the payload body data to the object. The executable object generates output data which is formatted by the process module 1219 into an HTTP response sent to the requesting client.

If test module 1214 determines that the source code file needs to be compiled, a compile class module 1215 will compile all objects in the source code file. Once the compilation has been completed, a web method attribute module 1217 identifies all publicly available attributes to publicly accessible web service methods. These methods and corresponding attributes are the values that may be passed to the server from the client as part of a web service request. A cache compiled object module 1218 stores the newly compiled object, along with a description of its publicly accessible methods/attributes into the web services library 303 for use in subsequent requests for this service before the object is passed to the process module 1219. The process module 1219 again activates the object to generate a response and the processing ends 1102.

FIG. 2 illustrates an example of a suitable operating environment 200 in which the invention may be implemented. The operating environment 200 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, held-held or laptop devices, multiprocessor systems, microprocessor-based systems, programmable consumer electronics, network PCs, minicomputers, mainframe computers, distributed computing environments that include any of the above systems or devices, and the like.

The invention may also be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed in desired in various embodiments.

Network server 102 typically includes at least some form of computer readable media. Computer readable media can be any available media that can be accessed by network server 102. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, BC-ROM, digital versatile disks (DVD) or other optical storage, magnetic cassettes, magnetic tape, magnetic disk storage or other magnetic storage devices, or any other medium which can be used to store the desired information and which can be accessed by network server 102. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

While the above embodiments of the present invention describe a network based processing system providing processing services to remote clients, one skilled in the art will recognize that the various distributed computing architectures may be used to implement the present invention as recited within the attached claims. It is to be understood that other embodiments may be utilized and operational changes may be made without departing from the scope of the present invention.

The foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. Thus the present invention is presently embodied as a method, apparatus, computer storage medium or propagated signal containing a computer program for providing a method, apparatus, and article of manufacture for providing network based processing system providing processing services to remote clients.

What is claimed is:

1. A method, executed in a computer system, for automatically creating data exchange schema data on a network server corresponding to remote processing services provided by the network server for source code corresponding to data processing objects used to provide the remote processing services upon receipt of a request from a client, the method comprising:

storing a source code file within the mass storage of the server;

receiving a processing service request;

determining the processing service to be performed by examining one or more items of payload data in the processing service request;

determining if a compiled version of the data processing object for the processing service requested is stored in a web services library;

if the data processing object is not stored in the web services library, compiling the source code file to generate a data processing object, the data processing object providing the requested processing service;

automatically generating the data exchange schema data that specifies how to exchange data between the server and the client for the data processing object, the data exchange schema data generated when the source code file is compiled to generate the data processing object, the data exchange schema data being a separate description from storing both the data exchange schema data and the data processing object within the web services library for use by subsequent processing service requests;

receiving a first subsequent processing service request from a subsequent client;

determining if a compiled version of the data processing object is stored in the web services library;

if the data processing object is stored in the web services library, separately providing the data exchange schema data to the subsequent client, the subsequent client determining format and function of input and output arguments of the data processing object from the data exchange schema data;

receiving a second subsequent processing service request from the subsequent client, the second subsequent processing service request comprised of payload data received in accordance with the data exchange schema data;

in response to receiving the subsequent payload data in the second subsequent processing request, executing the data processing object to generate a response; and sending the response to the subsequent client.

2. The method according to claim 1, wherein data exchange schema data comprises an HTML representation for a web page containing a description of exposed data processing services.

3. The method according to claim 2, wherein the web page comprises:

a textual description of each exposed data processing service based upon data stored within the source code file;

a description of each input argument accepted by each exposed data processing service, the description includes a description of the input argument and a description of the data format for the input argument data expected by the exposed data processing service; and a description of each output data value generated by each exposed data processing service.

4. The method according to claim 3, wherein the description of each input argument further comprises an input field upon the generated web page for permitting a user to input a value to be passed to the exposed data processing service as the corresponding input argument.

5. The method according to claim 4, wherein the description of each output data value generated by each exposed data processing service further comprises an activate button which causes the remote data processing service to be activated using the values contained within the input fields corresponding to the input arguments as the input arguments submitted with the remote data processing service request.

6. The method according to claim 1, wherein the data exchange schema data comprises a specification for the input and output data schema expressed in a data transfer specification language.

7. The method according to claim 6, wherein the data transfer specification language comprises a Web Services Description Language representation for the data exchange schema data.

8. The method according to claim 6, wherein the data transfer specification language comprises a Resource Description Format representation for the data exchange schema data.

9. A computer readable storage medium executable by a computing system and encoding instructions for automatically creating data exchange schema data on a network server corresponding to remote processing services provided by the network server for source code corresponding to data processing objects used to provide the remote processing services upon receipt of a request from a client process, the computer process comprising:

storing a source code file within the mass storage of the server;

receiving a processing service request;

determining the processing service to be performed by examining one or more items of payload data in the processing service request;

determining if a compiled version of the data processing object for the processing service requested is stored in a web services library;

if the data processing object is not stored in the web services library, compiling the source code file to generate a data processing object, the data processing object providing the requested processing service;

automatically generating the data exchange schema data that specifies how to exchange data between the server and the client for the data processing object, the data exchange schema data generated when the source code file is compiled to generate the data processing object, the data exchange schema data being separate from the data processing object;

storing both the data exchange schema data and the data processing object within the web services library for use by subsequent processing service requests; and receiving a first subsequent processing service request from a subsequent client;

determining if a compiled version of the data processing object is stored in the web services library;

if the data processing object is stored in the web services library, separately providing the data exchange schema data to a subsequent client, the subsequent client determining format and function of input and output arguments of the data processing object from the data exchange schema data;

receiving a second subsequent processing service request from the subsequent client, the second subsequent processing service request comprised of payload data received in accordance with the data exchange schema data;

in response to receiving the subsequent payload data, in the second subsequent processing request, executing the data processing object to generate a response; and sending the response to the subsequent client.

10. The computer readable storage medium according to claim 9, wherein data exchange schema data comprises an HTML representation for a web page containing a description of exposed data processing services.

11. The computer readable storage medium according to claim 10, wherein the web page comprises:

a textual description of each exposed data processing service based upon data stored within the source code file;

a description of each input argument accepted by each exposed data processing service, the description includes a description of the input argument and a description of the data format for the input argument data expected by the exposed data processing service; and a description of each output data value generated by each exposed data processing service.

12. The computer readable storage medium according to claim 11, wherein the description of each input argument further comprises an input field upon the generated web page for permitting a user to input a value to be passed to the exposed data processing service as the corresponding input argument.

13. The computer readable storage medium according to claim 12, wherein the description of each output data value generated by each exposed data processing service further comprises an activate button which causes the remote data processing service to be activated using the values contained within the input fields corresponding to the input arguments as the input arguments submitted with the remote data processing service request.

14. The computer readable storage medium according to claim 9, wherein the data exchange schema data comprises a specification for the input and output data schema expressed in a data transfer specification language.

15. The computer readable storage medium according to claim 14, wherein the data transfer specification language comprises a Web Services Description Language representation for the data exchange schema data.

16. The computer readable storage medium according to claim 14, wherein the data transfer specification language comprises a Resource Description Format representation for the data exchange schema data.

* * * * *

UNITED STATES PATENT AND TRADEMARK OFFICE
CERTIFICATE OF CORRECTION

| | | |
|---|---|---|
| PATENT NO. | : 7,493,397 B1 | Page 1 of 1 |
| APPLICATION NO. | : 09/875324 | |
| DATED | : February 17, 2009 | |
| INVENTOR(S) | : Scott D. Guthrie et al. | |

It is certified that error appears in the above-identified patent and that said Letters Patent is hereby corrected as shown below:

In column 15, line 23, in Claim 1, after "from" insert -- the data processing object; --.

In column 17, line 1, in Claim 9, delete "data," and insert -- data --, therefor.

Signed and Sealed this

Third Day of May, 2011

David J. Kappos
*Director of the United States Patent and Trademark Office*